US009986217B2

(12) United States Patent
Ellwood, Jr.

(10) Patent No.: US 9,986,217 B2
(45) Date of Patent: May 29, 2018

(54) MAGNETO PHOTONIC ENCODER

(71) Applicant: Sutherland Cook Ellwood, Jr., Cheltenham (GB)

(72) Inventor: Sutherland Cook Ellwood, Jr., Cheltenham (GB)

( * ) Notice: Subject to any disclaimer, the term of this patent is extended or adjusted under 35 U.S.C. 154(b) by 0 days. days.

(21) Appl. No.: 15/457,991

(22) Filed: Mar. 13, 2017

(65) Prior Publication Data

US 2018/0041743 A1  Feb. 8, 2018

Related U.S. Application Data

(60) Provisional application No. 62/308,585, filed on Mar. 15, 2016.

(51) Int. Cl.
*H04N 9/67* (2006.01)
*H04N 9/76* (2006.01)
*H04N 9/31* (2006.01)
*G02B 1/00* (2006.01)

(52) U.S. Cl.
CPC .............. *H04N 9/67* (2013.01); *G02B 1/005* (2013.01); *H04N 9/3179* (2013.01); *H04N 9/76* (2013.01)

(58) Field of Classification Search
None
See application file for complete search history.

(56) References Cited

U.S. PATENT DOCUMENTS

| 6,901,194 | B2 * | 5/2005 | Charlton | B82Y 20/00 385/122 |
| 9,722,396 | B2 * | 8/2017 | Watanabe | H01S 5/0683 |
| 2009/0219602 | A1 * | 9/2009 | Alameh | G02F 1/09 359/280 |
| 2009/0269005 | A1 * | 10/2009 | Sigalas | B82Y 20/00 385/16 |
| 2016/0326334 | A1 * | 11/2016 | Jiang | G01N 21/00 |

FOREIGN PATENT DOCUMENTS

EP  1503328 A1 *  2/2005  ............ B82Y 10/00

* cited by examiner

*Primary Examiner* — Tina Wong
(74) *Attorney, Agent, or Firm* — Patent Law Offices of Michael E. Woods; Michael E. Woods

(57) ABSTRACT

A magneto photonic encoder, in plane, includes a set of periodic structures of magneto photonic crystals for rotating a polarization of a beam of light responsive to a controllable magnetic field as it is transmitted through the periodic structures. The rotated polarization, in cooperation with a non-reciprocal-mode conversion device produces an encoded signal without use of crossed polarizers. Path optics guide the light beam into the periodic structures for polarization rotation and then to direct the modified beam of light into the non-reciprocal-mode conversion device. Depending upon the implementation, the encoded output may serve as display image primitive precursor to produce an image constituent signal.

25 Claims, 6 Drawing Sheets

MAGNETO PHOTONIC ENCODER

CROSS REFERENCE TO RELATED APPLICATIONS

This application claims benefit of U.S. Patent Application No. 62/308,585 filed 15 Mar. 2016, and this application is related to U.S. patent application Ser. No. 12/371,461, and this application is related to U.S. Patent Application No. 62/308,361, the contents of each of which are all hereby expressly incorporated in their entireties by reference thereto for all purposes.

FIELD OF THE INVENTION

The present invention relates generally to video and digital image and data processing devices and networks which generate, transmit, switch, allocate, store, and display such data, as well as non-video and non-pixel data processing in arrays, such as sensing arrays and spatial light modulators, and the application and use of data for same, and more specifically, but not exclusively, to digital video image displays, whether flat screen, flexible screen, 2D or 3D, or projected images, and non-display data processing by device arrays, and to the spatial forms of organization and locating these processes, including compact devices such as flat screen televisions and consumer mobile devices, as well as the data networks which provide image capture, transmission, allocation, division, organization, storage, delivery, display and projection of pixel signals or data signals or aggregations or collections of same.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In the field of image display and projection devices, including liquid crystal displays (LCD), gas plasma display panels (PDP's), organic light-emitting diode (OLED), DMD (digital micro-mirror devices), and cathode ray tube (CRT), among the leading and most successful technologies, artificial limitations exist today which prevent the further development of many performance and value criteria and desirable new display features for devices based on these (or any) core modulation technologies.

A major artificial limitation on the further development of any display or projection modulation technology is the tendency to conceive of any display technology as identical to the modulation technology employed to change the fundamental state of pixel or sub-pixel "on" (lighted) or "off" (dark). A display technology is generally thought of as identical to the pixel-state modulation technology itself. Thus, in general, improvements of the display technology is conceived of as improving the characteristics of an integrated modulator device, the "light-valve."

Focus has therefore been on improving such modulator device features as the color transmission efficiency of the modulator materials for each color of whatever color system (typically, red-green-blue or RGB) is employed to realize color in a display; related thermal efficiency of the modulator device for the colors which pass through the modulator; switching speed of the modulator device for the colors which pass through the modulator; power consumption of the integrated color modulator; filtering efficiency of modulators which modulate white light and which must be color-filtered; and spatial compactness of the device, especially in the viewing plane (for minimum fill-factor between sub-pixels or pixels), but also in the depth of the device for direct-view displays where thinness is desired. Flexibility of the display structure is also desirable for many applications, and there are limitations on options to achieve this when there is an assumption of one integrated modulator device per sub-pixel.

Solutions to this conceptual straight-jacket have been proposed by the inventor of the present disclosure (the incorporated pending '461 application), which de-couples the conception of an image display or projection system from this one-integrated-modulator-per-viewable-sub-pixel constraint. Passive and active optical components, including novel 3-dimensional textile structures employing novel passive and active optical fibers, are proposed as part of a novel telecom-structured display architecture, in which signal is generated, distributed, and aggregated from modulation means to realize many-to-one and one-to-many relationships between sub-pixel signal generation and final viewable sub-pixels and pixels.

A co-pending disclosure by the inventor of the present disclosure, the incorporated '361 application, applies those principles generally to the problem of pixel modulation itself at the basic constituent level, with a very wide range of embodiments that follow and are encompassed thereby.

A further application of this approach to the problem of an improved hybrid telecom-type display system is detailed in the present disclosure, combining techniques of "classical" and hybrid magneto-optic or magneto-photonic pixel logic with frequency modulation processes, such as phosphor absorption-emission systems and/or periodically-poled materials such as Ti:PPLN, PPKTP, and PPLN, and shocked crystals, band-optimization, or polarization mode processing stages, and optional signal amplification/gain signal amplification/gain stages, devices, or materials—to achieve display systems of substantially improved performance in all characteristics as compared to any other conventional display system solution. In addition, configurations of systems contemplated by the present disclosure enable local network and long-distance adaptation of and implementation for DWDM-type systems.

In summary, the present disclosure details both novel and improved systems as well as certain novel and improved components which may be used by such systems.

At this point, it is essential to review the history of the development of "magneto-optic/photonic" displays in general. After this review and consideration of the problems and solutions that have been developed up to this point, it will also become apparent what limitations still exist to further progress caused by a "mono-technology" approach to this category of display system.

The present disclosure thus includes not only the proposal of a system employing MO/MPC as a stage in "pixel-signal processing" and thus as a component technology of an overall telecom-type display system that is superior thereby, but it also proposes novel MO/MPC modulation technologies (devices and components and materials structures and systems) to realize improvements from this component contribution source as well.

However, in many if not all embodiments of the novel MO/MPC system, it is not required that the MO/MPC improvements be realized as a part of a telecom-type or structured system, but rather there is that much more performance and benefit that is realized by implementation of the improved component in the division-of-labor system herein proposed and in the previously referenced general disclosure of the co-pending application.

MO/MPC Display Development: A Brief History

Starting in the 1960's, the first three decades (approximately) of attempts to achieve a practical magneto-optic display saw many initial problems confronted, with some addressed partially at least, but no achievement of a practical display employing a light-valve based on a magneto-optic effect.

The first proposal for a display based on a magneto-optic light valve was made in the late 1960's, specifically, a proposal for a display formed from a passively-addressed array of discrete solenoid-type classical Faraday-effect rotators (relatively-high Verdet-constant garnet crystals wound with wire, similar to core memory elements), combined with crossed polarizers to realize a light-valve structure similar to an LCD light-valve. (Patent reference GB1,180,334, hereby incorporated by reference.)

However, the most significant effort was the one undertaken at Litton Industries, beginning in the eighties and continuing into the nineties, again evidently inspired by techniques from magnetic memory technology development—in this case, bubble memory.

In this effort, employing thick iron garnet films, a few of the basic system requirements that might be assumed to be required for a practical MO display were addressed.

Active-matrix addressing, an obvious implementation of technology developed for LCD and other array technologies (displays and sensors), magnetic domain management techniques, and increasing the B field by means of increasing the number of windings of a superficial coil-like structure were among the significant solutions proposed.

Reflecting the essential limitations of the Litton bubble-memory-type approach was this strategy for reducing power and potentially increasing switching speed by means of this coil-structure proposal. Specifically, the proposal was to deposit sinuous, recursive loops on the surface of the MO films surrounding each subpixel, with the lines forming a continuous series of small loops as the conductive track eventually "encircling" the subpixel in one continuous track of horizontal "coil windings", the line never "crossing" itself, before returning to the origin. In appearance these looked like "squiggles."

This coil-winding-like, superficial field-generating structure, realizing a coil-like additive effect on the net B field surrounding the subpixel, both reflected other problems unaddressed by Litton, as well as creating or compounding others.

Without knowing anything about the optical or magnetic problems with the Litton designs, it is obvious that the strategy of increasing B field and domain switching efficiency by using the surface of the crystal surrounding the relative "core" for a superficial winding structure would negatively impact display performance by increasing fill-factor.

In addition, this strategy did not address and actually would exacerbate the problem of magnetic cross-talk between subpixels. Because of the employment of continuous bulk MO films as the deposition surface for field-generating "squiggles," the increase in B field without any structure and/or materials strategy to isolate each sub-pixel from the other will result in increased cross-talk and thus a degradation of the contrast and in fact the basic operation of the array as a display.

Magnetic cross-talk is a problem in the Litton design because adjacent sub-pixels are partially or almost fully switched; from the point of view of the viewer of the display, the array becomes a smudged blur. (It should be noted that the problem of magnetic cross-talk also existed for other and earlier attempts at a practical magneto-optic display).

Optical cross-talk was another fundamental problem of the Litton approach, as it had also been for earlier attempts.

What was missing from all prior attempts at a practical magneto-optic display, whether transmissive or reflective (both modes being possible because of the non-reciprocal nature of the classical Faraday Effect of magnetic-field induced polarization rotation), was a waveguiding structure to effectively form a pixel, or what is referred to in the present disclosure as a "pixel signal."

This absence is evident from the fact that, within the continuous MO film, there was no structure to control the path of the incident beam to ensure its passage only through a designated modulation zone and not through the spaces between pixels or into other pixels and to control its exit from the modulation zone and light valve for formation of a controlled pixel of minimally acceptable optical qualities.

The thicker the films, which were required by all prior designs to realize (through increase of the path-length variable 1 of the classical Faraday effect equation) increased Faraday rotation in the quest for power reduction and switching efficiency, the greater this problem. Lacking practical beam control and insertion for arrays, and even more problematic, lack of control of the propagation of rays through the MO material (including both forward propagating rays as well as management of any reflected rays), is more and more of a problem as the safe cone of insertion becomes narrower and narrower the thicker the film for rays that either continue at the edge of a cone angle of insertion with respect to the film surface or, worse, refract and bend and thus depart the pixel/active zone and pass through the fill between pixels and into other pixels.

It should be noted that while planar (or "superficial") waveguides, especially rib waveguides, had been employed in the fabrication of planar Faraday-effect devices for telecom and other non-display applications for many years, there had been no solution or proposals for using such planar devices for the purposes of any kind of display array to in-couple or out-couple the light required for the input illumination or output sub-pixel or pixel. And these planar devices, even as Faraday-effect devices per se, had limitations of their own, including feature size, lack of sufficient or any real integration of the device (including all the features and active components required for a Faraday-effect-based light valve), and absence of all of the features and techniques possible for improving the performance of the device, whether implemented discretely or integrated.

So, to summarize, efforts to develop a practical magneto-optic array for display (or, for that matter, other array applications such as for spatial light modulators (or "SLM's") up to and through the development efforts of Litton, included but were not limited to:

1. High power requirements, as usually associated with conventional understanding of Faraday-effect based devices from that era.

2. Continuous addressing of each pixel required by the system substantially contributed to the unnecessarily high power requirements.

3. Contributing to this was the quality of bulk magneto-optic films available or developed, with Verdet constants too low for practical display applications, at least not without major advancements and solutions addressing all other possible aspects of a Faraday-effect-based light valve, array of such, and display (or SLM) of such.

4. The lower the Verdet constant, the greater the reliance on thicker films.

5. Thicker films become more difficult to saturate and permeate with the imposed B field from a coil structure fabricated on the top surface of the film and array.

6. Magnetic cross talk, which is made worse the thicker the films employed.

7. Optical cross talk, which is made worse the thicker the films employed.

8. Unacceptable fill-factor due to the employment of surface-area hogging superficial "squiggle" coil-structures to address the problem of managing current amplitude. The unacceptable fill-factor between pixels creates the "venetian blind" effect of visible pixel gaps, which substantially degrades the human visual systems perception of an array of pixels as a single, integrated image.

9. No color display solution. In bulk MO films, no MO films had been proposed or fabricated which could both transmit sufficient green and especially blue light while also generating sufficient Faraday rotation to implement a native MO blue or green pixel light-valve. And no other solutions, either employing something other than bulk MO films or native MO switching of blue or green light, had been proposed or fabricated. The best performing iron garnet materials of the time, such as Bi-substituted YIG, perform optimally in near-infrared or infrared, and well in red. But very, very poorly and inefficiently for green light, and essentially nothing (vanishingly small) for blue. This is generally due to the absorption of the shorter wavelengths, especially blue, by the iron or iron oxide in the compositions.

10. No display-size scaling solution for displays larger than those possible with small, high-quality MO films restricted to the size of quality films that could be fabricated. This followed from reliance on continuous, defect-free high quality MO films for design approach.

11. No practical resolution-scaling solution for displays of resolution beyond very small resolutions. This was due to the power requirements and the problems of magnetic domain-management of each sub-pixel in series.

And, with the exception of the color requirement, all of these problems also applied to non-display applications of magneto-optic device arrays, such as SLM's for telecom.

Thus, up until approximately 2001, the status of magneto-optic display development might be summarized thusly:

Limited, at best to: small displays or SLM's of up to perhaps 32×32 or 16×16 resolution, displaying at best crude red (pixel) images, and extremely power-inefficient—to such a degree that even for applications that might have benefited from the most obvious reason to pursue a magneto-optic based display non did.

Why, then, all the effort expended?

Because of the potential—inherent in the demonstrated commercial application, over decades, of Faraday-effect based modulators, rotators, and isolators for telecom and sensing applications—to realize extremely high speed switching—i.e., for displays, that means very, very high frame rates—unbeatably high.

In addition, another lure was the potential to be a simpler and easier to manufacture technology than LCD, plasma, or MEMS.

And finally, much greater thermal robustness and stability. MO materials perform better at high temperatures, for instance.

So, there were some very good reasons to make the effort to realize a practical MO-based display system.

Post-Litton: Two Development Programs that Changed the Field of MO-based Displays and SLM's To accurately characterize the state of the art of MO-based displays and SLM's, two ("post-Litton") programs, including one directed by the author of the present disclosure, must be described:

First, while labeling them "post-Litton," that is only a rough characterization as it only applies to the difference between the approximate start of these two programs, both of which arguably began before 2000, and one definitely beginning in 1990, not long after the start of the Litton program.

The first program, an SLM program for primary application to holographic optical storage disc technology (Optware Corporation), under Prof. Mitsuteru Inoue, addressed one of the major limitations of the prior programs and efforts by proposing a solution to magnetic cross-talk between pixels.

The first 128×128 pixel arrays fabricated in the early 2000's realized a form of magnetic pixel isolation by means of deep-ion-etching of LPE thick films of iron garnet materials. Thus, the air gaps (yielding relatively large gaps or fill-factor) between "pixels" implemented a relatively magnetically impermeable barrier between pixels.

In addition, the devices created by Inoue for Optware's holographic disc system included active-matrix addressing, and other updated features required for addressing the MO-array quickly and with some degree of power reduction.

Fast switching speeds were realized, on the order of 25 ns.

While there were other valuable attributes of this device solution for the SLM application, on its own that major design improvement over Litton did not address the many other problems of realizing a practical MO-based display.

The second program, which entered commercialization phase in the early 2000's after development that began in 1990 and which was based on proposals, including patents issued and pending by the author of the present disclosure plus contributions on materials innovations by other members of the team, yielded the following innovations and improvements, among others:

1. Solutions for optical crosstalk: Optical waveguide control over light path.

2. Solutions for magnetic crosstalk: use of impermeable materials to isolate, and optionally with highly-permeable materials to "pull" field lines "in" towards the pixel.

3. Bi-stable MO/MPC switch for Power Reduction and switching efficiency using Composite magnetic materials structures (also called "exchange-coupled" materials structures) to implement "latching" of pixels, so that pixels may be addressed with a short pulse of current to the field structure of a sub-pixel/pixel instead of a continuous addressing to the pixel.

4. Bi-stable MO/MPC switch for Power Reduction and switching efficiency: Development of latching MO materials and films, by chemical composition, are latchable as individual "bulk" films.

5. Color display: The first practical MO "blue" materials, which demonstrated sufficient transmission for the human visual system in a display system as well as sufficient Faraday rotation for sufficient contrast.

6. Color display: filtering methods, used on conjunction with color-efficient MO materials.

7. Power reduction and switching efficiency: first 1D magneto-photonic crystal devices for display, both multilayer films and planar gratings structures. Leveraging demonstrated contribution of photonic crystals in the context of non-reciprocal classical Faraday effect, the effective path-length is increased and other enhancements over the "bulk" Verdet constant of any of the MO material layers. Major enhancement of faraday rotation and transmission over bulk materials.

8. Power reduction: Multi-layer coil structures for more efficient MO/MPC film penetration and thus power reduction—top, bottom, and intermediate coil structures, with negligible impact to fill-factor.

9. Power reduction and magnetic cross-talk reduction: Transparent, in-path coil structures for improved field penetration and reduced magnetic cross-talk and no negative impact on fill-factor.

10. Implementation of surface plasmons for potential improvement in device simplification.

11. Implementation of ring-resonators for more compact (reduced feature size), especially for SLM's and chip-platform displays for projectors, etc.

12. Display-size scaling solutions, including through implementing integrated MO-based switch in an optical fiber, as a fiber-device: making larger displays by fiber device arrays, including fabricating the arrays in textile-composite structures and through textile-composite type fabrication and other mechanical fabrication processes.

13. Fully-integrated "3D" MO/MPC switches, planar switches, and fiber switches, for reduced cost of manufacture and greater efficiency, including all "conventional" and new switch elements—composite magnetic materials for domain management and bi-stable switch/latching; polarizer and analyzer ("crossed polarizers"), color filtering, coil-structure, waveguiding, magnetic isolation, etc.

14. Commercialization of cheaper quartz and silicon substrates using lower-temperature film fabrication technologies.

The solutions listed (previously disclosed and developed as devices, materials, and working display systems) by the author of the present disclosure or developed by the teams under his direction, fully addressed all the obstacles to realizing a practical MO/MPC-based display that had existed previously, even after the important work of the Litton and all previous programs. Among the benchmarks set:

Pixel switching speeds less than 15 ns were demonstrated, among other high-performance attributes—approximately 1 million times faster than LCD and 1000 times faster than DMD.

Low-power, bi-stable switches otherwise only realized by lower-image quality B&W display technologies like E-Ink (electrophoretic), fully addressing one of the greatest misconceptions and previous limitations and criticism of the concept of a MO-based display.

Full-color capable with better transmission efficiencies than LCD.

Solid-state crystal devices of much simpler device and manufacturing complexity, and lower cost Lower cost display-size scaling solution, cheaper than that achieved by LC Thermally stable and robust, reducing cooling requirements and thus operating cost.

However, it is the contention of the present disclosure that there are none-the-less further significant improvements possible for MO and MPC related devices, especially configured in arrays both for display and non-display applications (on-chip or spatially-separated). And several improvements of this kind are disclosed herein.

And that furthermore, it is the contention of the present disclosure that MO and MPC devices can contribute to an overall display system more effectively by being designed and optimized for those wavelengths for which best available materials and materials structures are natively best-performing, serving then instead as one method and stage in a de-composed display device pixel-signal processing system.

The reasons for adopting this strategy for the design optimization of MO/MPC devices in display system are explored more generally in some of the incorporated application, and it is pointed out for most if not all signal processing technologies, in which some attribute of a signal (pixel signal or information signal) is modified actively (energized) or passively (un-energized), the physical effect or process involved is materials dependent, requiring certain materials and not others; and for those materials, they are to some degree wavelength dependent.

So, for MO/MPC, as with other photonic or opto-electronic devices such as Mach-Zehnder devices, the physical effect is most effective and/or efficient for some frequencies/wavelengths over others.

In the conception of a display system based on multi-stage pixel-signal processing, this then implies that, whenever possible, all pixel-signal (or signal) processing stages are conducted using "frequencies/wavelengths of convenience." And that frequencies/wavelengths are modulated (shifted) between those stages to realize optimal (or more appropriate and thus closer to optimal) input frequencies.

As a practical matter, and for the present disclosure, it is observed that MO and MPC materials and structures continue to perform best in red/near-infrared/infrared regime, as is in fact also true of many other signal processing techniques whose function is to encode an optical signal with information (either data signal information or pixel signal information).

This fact continues to hold true even as photonic bandgap structures gain in effectiveness or efficiency moving from 1D to 3D periodic structures, and is also true as novel properties are discovered from fabrication of nano-scale materials of different sizes and/or shapes. This persists as well in the case of certain types of composite meta-materials in which nano-crystals are encapsulated by other structures through materials synthesis, such as through so-called molecular self-assembly employing room and in general relatively low-temperature colloidal solutions. Still, the new properties that may be sought tend to perform best at certain wavelengths over others.

The novel and/or improved properties, such as differing colors at nano-scale vs. bulk for the same chemical formulation, or differing properties due to different geometric/materials structures such as graphene vs. carbon nanotubes, as demonstrated in a range of ongoing materials and nano-materials research and innovation, continue to vary in strength/intensity with wavelength (and current amplitude, fields, etc.)

Fully-synthetic meta-material types composed of combinations of nano-scale antennae and ring-resonators may provide a pathway to greater flatness of response and performance across frequencies, voltages, current amplitude, field strengths, etc, though it may be reasonably hypothesized that there will be variability of performance based on the materials used to form the synthetic structures. And, more importantly, extremely broad-band response will almost certainly be the exception rather than the rule for materials performance going forward.

It is the recognition of this fact, of the wavelength-dependent response of materials for signal processing, that suggests the substantial improvement to the performance of a display system employing magneto-optic modulation (or magneto-photonic modulation) techniques to encode the basic on/off information of the pixel signal, specifically, that a better system, the system of the present disclosure, will result from optimizing an MO/MPC device design for modulation in non-visible near-infrared, followed by subsequent, device optimized pixel-signal optimization steps until the pixel signal exits the display system as an element of an image observed by the human visual system.

It is noted as well that this disclosure, of device optimization according to "wavelengths/frequencies of convenience," applies in most cases equally as well to non-display device arrays and photonic integrated circuits (PIC's).

As is further disclosed in some of the incorporated application, this observation also applies to a display system employing other best-in-breed signal modulation devices such as Mach-Zehnder interferometer devices, but the specifics of the present disclosure are focused on the details of an hybrid MO/MPC-based display device, working in combination with other pixel-signal processing devices and especially a frequency/wavelength modulation means, to realize a superior MO/MPC based display system.

What is needed is a system and method for re-conceiving the process of capture, distribution, organization, transmission, storage, and presentation to the human visual system or to non-display data array output functionality, in a way that liberates device and system design from compromised functionality of non-optimized operative stages of those processes and instead de-composes the pixel-signal processing and array-signal processing stages into operative stages that permits the optimized function of devices best-suited for each stage, which in practice means designing and operating devices in frequencies for which those devices and processes work most efficiently and then undertaking efficient frequency/wavelength modulation/shifting stages to move back and forth between those "Frequencies of convenience," with the net effect of further enabling more efficient all-optical signal processing, both local and long-haul. A specific object of the particular and improved systems of the present disclosure are configurations designed around the optimal use and operation of magneto-optic type devices and operations, performing key operative stage(s) in non-visible IR/near-IR frequencies, integrated with best-in-breed frequency/wavelength modulation/shifting means, and together implementing novel all-optical "display over network" and all-optical network migration, compatible with and evolving the next generation of dense wavelength division multiplexing (DWDM)-type networks.

BRIEF SUMMARY OF THE INVENTION

Disclosed is a system and method for re-conceiving the process of capture, distribution, organization, transmission, storage, and presentation to the human visual system or to non-display data array output functionality, in a way that liberates device and system design from compromised functionality of non-optimized operative stages of those processes and instead de-composes the photonic-signal processing and array-signal processing stages into operative stages that permits the optimized function of devices best-suited for each stage, which in practice means designing and operating devices in frequencies for which those devices and processes work most efficiently and then undertaking efficient frequency/wavelength modulation/shifting stages to move back and forth between those "Frequencies of convenience," with the net effect of further enabling more efficient all-optical signal processing, both local and long-haul.

The following summary of the invention is provided to facilitate an understanding of some of technical features related to signal processing, and is not intended to be a full description of the present invention. A full appreciation of the various aspects of the invention can be gained by taking the entire specification, claims, drawings, and abstract as a whole.

Embodiments of this invention may involve decomposing the components of an integrated pixel-signal "modulator" into discrete signal processing stages and thus into a telecom-type network, which may be compact or spatially remote. The operatively most basic version proposes a three-stage "pixel-signal processing" sequence, comprising: pixel logic "state" encoding, which is typically accomplished in an integrated pixel modulator, which is separated from the color modulation stage, which is in turn separated from the intensity modulation stage. A more detailed pixel-signal processing system is further elaborated, which includes sub-stages and options, and which is more detailed and specifically-tailored to the efficient implementation of magneto-photonic systems, and consist in 1) an efficient illumination source stage in which bulk light, preferably non-visible near-IR, is converted to appropriate mode(s) and launched into channelized array and which supplies stage 2), pixel-logic processing and encoding; followed by 3) optional non-visible energy filter and recovery stage; 4) optional signal-modification stage to improve/modify attributes such as signal splitting and mode modification; 5) frequency/wavelength modulation/shifting and additional bandwidth and peak intensity management; 6) optional signal amplification/gain; 7) optional analyzer for completing certain MO-type light-valve switching; 8) optional configurations for certain wireless (stages) of Pixel-signal Processing and Distribution. In addition, a DWDM-type configuration of this system is proposed, which provides a version of and pathway to all-optical networks, with major attended cost and efficiencies to be gained thereby: specifically motivated and making more efficient the handling of image information, both live and recorded. And finally, new hybrid magneto-photonic devices and structures are proposed and others previously not practical for systems of the present disclosure enabled, to make maximal use of the pixel-signal processing system and around which such a system is optimally configured, including new and/or improved versions of devices based on the hybridization of magneto-optic and non-magneto-optic effects (such as slow light and inverse-magneto-optic effects), realizing new fundamental switches, and new hybrid 2D and 3D photonic crystal structure types which improve a many if not most MPC-type devices for all applications.

In an incorporated application, a new class of display systems is proposed, which de-compose the components of a typically integrated pixel-signal "modulator" into discrete signal processing stages. Thus, the basic logic "state" of what is typically accomplished in an integrated pixel modulator is separated from the color modulation stage which is separated from the intensity modulation stage. This may be thought of as a telecom signal-processing architecture applied to the problem of visible image pixel modulation. Typically, three signal-processing stages and three separate device components and operations are proposed, although additional signal-influencing operations may be added and are contemplated, including polarization characteristics, conversion from conventional signal to other forms such as polaritons and surface plasmons, superposition of signal (such as a base pixel on/off state superposed on other signal data), etc. Highly distributed video-signal processing architectures across broadband networks, serving relatively "dumb" display fixtures composed substantially of later stages of passive materials, is a major consequence, as well as compact photonic integrated circuit devices which implement discrete signal processing steps in series, on the same device or devices in intimate contact between separate devices, and in large arrays.

In the present disclosure of an improved and detailed version of a hybrid telecom-type, pixel-signal processing display system employing magneto-optic/magneto-photonic stages/devices in combination with other pixel-signal processing stages/devices, including especially frequency/wavelength modulation/shifting stages and devices, which may be realized in a robust range of embodiments, are also included improved and novel hybrid magneto-optic/photonic components, not restricted to classic or non-linear Faraday Effect MO effects but more broadly encompassing non-reciprocal MO effect and phenomena and combinations therefrom, and also including hybrid Faraday/slow-light effects and Kerr effect-based and hybrids of Faraday and MO Kerr effect-based devices and other MO effects; and also including improved "light-baffle" structures in which the path of the modulated signal is folded in-plane with the surface of the device to reduce overall device feature size; and also including quasi 2D and 3D photonic crystal structures and hybrids of multi-layer film PC and surface grating/poled PC; and also hybrids of MO and Mach-Zehnder interferometer devices.

Encompassing therefore both earlier MO-based devices as well as the improved devices disclosed herein, the present disclosure proposes a telecom-type or telecom-structured, pixel-signal processing system of the following process-flow of pixel signal processing (or, equally, PIC, sensor, or telecom signal processing) stages and thus, architectures (and variants thereof) characterizing the system of the present disclosure:

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
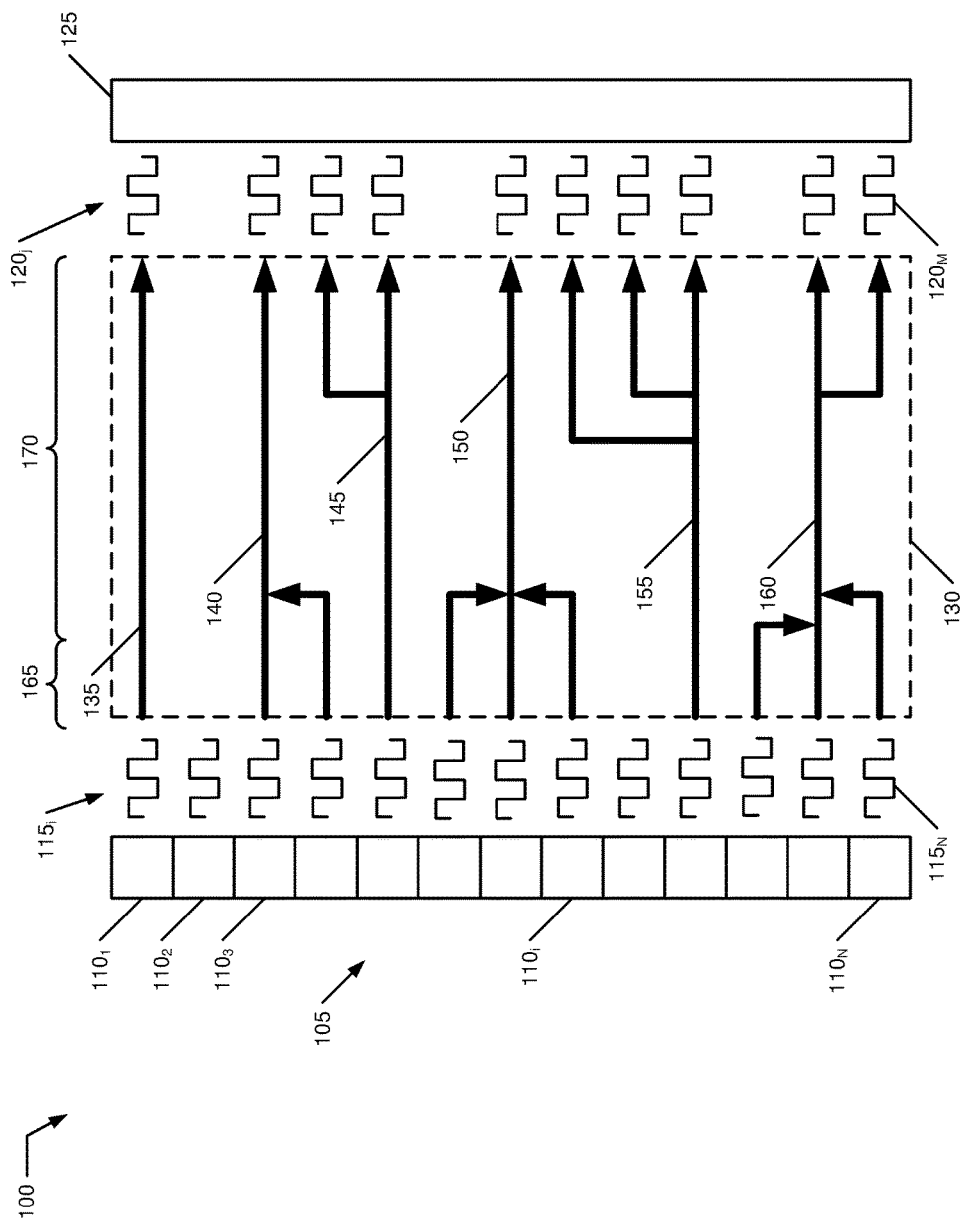
FIG. 1 illustrates an imaging architecture that may be used to implement embodiments of the present invention.

Embodiments of the present invention provide a system and method for re-conceiving the process of capture, distribution, organization, transmission, storage, and presentation to the human visual system or to non-display data array output functionality, in a way that liberates device and system design from compromised functionality of non-optimized operative stages of those processes and instead de-composes the pixel-signal processing and array-signal processing stages into operative stages that permits the optimized function of devices best-suited for each stage, which in practice means designing and operating devices in frequencies for which those devices and processes work most efficiently and then undertaking efficient frequency/wavelength modulation/shifting stages to move back and forth between those "Frequencies of convenience," with the net effect of further enabling more efficient all-optical signal processing, both local and long-haul. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "functional device" means broadly an energy dissipating structure that receives energy from an energy providing structure. The term functional device encompasses one-way and two-way structures. In some implementations, a functional device may be component or element of a display.

As used herein, the term "display" means, broadly, a structure or method for producing display constituents. The display constituents are a collection of display image constituents produced from processed image constituent signals generated from display image primitive precursors. The image primitive precursors have sometimes in other contexts been referred to as a pixel or sub-pixel. Unfortunately the term "pixel" has developed many different meanings, including outputs from the pixel/subpixels, and the constituents of the display image. Some embodiments of the present invention include an implementation that separates these elements and forms additional intermediate structures and elements, some for independent processing, which could further be confused by referring to all these elements elements/structures as a pixel so the various terms are used herein to unambiguously refer to the specific component/element. A display image primitive precursor emits an image constituent signal which may be received by an intermediate processing system to produce a set of display image primitives from the image constituent signals. The collection of display image primitives producing an image when presented, by direct view through a display or reflected by a projection system, to a human visual system under the intended viewing conditions. A signal in this context means an output of a signal generator that is, or is equivalent to, a display image primitive precursor. Importantly, that as long as processing is desired, these signals are preserved as signals within various signal-preserving propagating channels without transmission into free space where the signal creates an expanding wavefront that combines with other expanding wavefronts from other sources that are also propagating in free space. A signal has no handedness and does not have a mirror image (that is there is not a reversed, upside-down, or flipped signal while images, and image portions, have different mirror images). Additionally, image portions are not directly additive (overlapping one image portion on another is difficult, if at all possible, to predict a result) and it can be very difficult to process image portions. There are many different technologies that may be used as a signal generator, with different technologies offering signals with different characteristics or benefits, and differing disadvantages. Some embodiments of the present invention allow for a hybrid assembly/system that may borrow advantages from a combination of technologies while minimizing disadvantages of any specific technology. Incorporated U.S. patent application Ser. No. 12/371,461, describes systems and methods that are able to advantageously combine such technologies and the term display image primitive precursor thus covers the pixel structures for pixel technologies and the sub-pixel structures for sub-pixel technologies.

As used herein, the term "signal" refers to an output from a signal generator, such as a display image primitive precursor, that conveys information about the status of the signal generator at the time that the signal was generated. In an imaging system, each signal is a part of the display image primitive that, when perceived by a human visual system under intended conditions, produces an image or image portion. In this sense, a signal is a codified message, that is, the sequence of states of the display image primitive precursor in a communication channel that encodes a message. A collection of synchronized signals from a set of display image primitive precursors may define a frame (or a portion of a frame) of an image. Each signal may have a characteristic (color, frequency, amplitude, timing, but not handedness) that may be combined with one or more characteristics from one or more other signals.

As used herein, the term "human visual system" (HVS) refers to biological and psychological processes attendant with perception and visualization of an image from a plurality of discrete display image primitives, either direct view or projected. As such, the HVS implicates the human eye, optic nerve, and human brain in receiving a composite of propagating display image primitives and formulating a concept of an image based on those primitives that are received and processed. The HVS is not precisely the same for everyone, but there are general similarities for significant percentages of the population.

FIG. 1 illustrates an imaging architecture 100 that may be used to implement embodiments of the present invention.

Some embodiments of the present invention contemplate that formation of a human perceptible image using a human visual system (HVS)—from a large set of signal generating structures includes architecture 100. Architecture 100 includes: an image engine 105 that includes a plurality of display image primitive precursors (DIPPs) $110_i$, i=1 to N (N may be any whole number from 1 to tens, to hundreds, to thousands, of DIPPs). Each DIPP $110i$ is appropriately operated and modulated to generate a plurality of image constituent signals $115_i$, i=1 to N (an individual image constituent signal $115_i$ from each DIPP $110_i$). These image constituent signals $115_i$ are processed to form a plurality of display image primitives (DIPs) $120_j$, j=1 to M, M a whole number less than, equal to, or greater than N. An aggregation/collection of DIPs $120_j$ (such as 1 or more image constituent signals $115_i$ occupying the same space and cross-sectional area) that will form a display image 125 (or series of display images for animation/motion effects for example) when perceived by the HVS. The HVS reconstructs display image 125 from DIPs $120_j$ when presented in a suitable format, such as in an array on a display or a projected image on a screen, wall, or other surface. This is familiar phenomenon of the HVS perceiving an image from an array of differently colored or grey-scales shadings of small shapes (such as "dots") that are sufficiently small in relation to the distance to the viewer (and HVS). A display image primitive precursor $110_i$ will thus correspond to a structure that is commonly referred to as a pixel when referencing a device producing an image constituent signal from a non-composite color system and will thus correspond to a structure that is commonly referred to as a sub-pixel when referencing a device producing an image constituent signal from a composite color system. Many familiar systems employ composite color systems such as RGB image constituent signals, one image constituent signal from each RGB element (e.g., an LCD cell or the like). Unfortunately, the term pixel and sub-pixel are used in an imaging system to refer to many different concepts—such as a hardware LCD cell (a sub-pixel), the light emitted from the cell (a sub-pixel), and the signal as it is perceived by the HVS (typically such sub-pixels have been blended together and are configured to be imperceptible to the user under a set of conditions intended for viewing). Architecture 100 distinguishes between these various "pixels or sub-pixels" and therefore a different terminology is adopted to refer to these different constituent elements.

Architecture 100 may include a hybrid structure in which image engine 105 includes different technologies for one or more subsets of DIPPs 110. That is, a first subset of DIPPs may use a first color technology, e.g., a composite color technology, to produce a first subset of image constituent signals and a second subset of DIPPS may use a second color technology, different from the first color technology, e.g., a different composite color technology or a non-composite color technology) to produce a second subset of image constituent signals. This allows use of a combination of various technologies to produce a set of display image primitives, and display image 125, that can be superior than when it is produced from any single technology.

Architecture 100 further includes a signal processing matrix 130 that accepts image constituent signals $115_i$ as an input and produces display image primitives $120_j$ at an output. There are many possible arrangements of matrix 130 (some embodiments may include single dimensional arrays) depending upon fit and purpose of any particular implementation of an embodiment of the present invention. Generally, matrix 130 includes a plurality of signal channels, for example channel 135-channel 160. There are many different possible arrangements for each channel of matrix 130. Each channel is sufficiently isolated from other channels, such as optical isolation that arises from discrete fiber optic channels, so signals in one channel do not interfere with other signals beyond a crosstalk threshold for the implementation/embodiment. Each channel includes one or more inputs and one or more outputs. Each input receives an image constituent signal 115 from DIPP 110. Each output produces a display image primitive 120. From input to output, each channel directs pure signal information, and that pure signal information at any point in a channel may include an original image constituent signal 115, a disaggregation of a set of one or more processed original image constituent signals, and/or an aggregation of a set of one or more processed original image constituent signals, each "processing" may have included one or more aggregations or disaggregations of one or more signals.

In this context, aggregation refers to a combining signals from an $S_A$ number, $S_A>1$, of channels (these aggregated signals themselves may be original image constituent signals, processed signals, or a combination) into a $T_A$ number ($1 \leq T_A \leq S_A$) of channels and disaggregation refers to a division of signals from an $S_D$ number, $S_D \geq 1$, of channels (which themselves may be original image constituent signals, processed signals, or a combination) into a $T_D$ number ($S_D<T_D$) of channels. $S_A$ may exceed N, such as due to an earlier disaggregation without any aggregation and $S_D$ may exceed M due a subsequent aggregation. Some embodiments have $S_A=2$, $S_D=1$ and $T_D=2$. However, architecture 100 allows many signals to be aggregated which can produce a sufficiently strong signal that it may be disaggregated into many channels, each of sufficient strength for use in the implementation. Aggregation of signals follows from aggregation (e.g., joining, merging, combining, or the like) of channels or other arrangement of adjacent channels to permit joining, merging, combining or the like of signals propagated by those adjacent channels and disaggregation of signals follows from disaggregation (e.g., splitting, separating, dividing, or the like) of a channel or other channel arrangement to permit splitting, separating, dividing or the like of signals propagated by that channel. In some embodiments, there may be particular structures or element of a channel to aggregate two or more signals in multiple channels (or disaggregate a signal in a channel into multiple signals in multiple channels) while preserving the signal status of the content propagating through matrix 130.

There are a number of representative channels depicted in FIG. 1. Channel 135 illustrates a channel having a single input and a single input. Channel 135 receives a single original image constituent signal $115_k$ and produces a single display image primitive $120_k$. This is not to say that channel 135 may not perform any processing. For example, the processing may include a transformation of physical characteristics. The physical size dimensions of input of channel 135 is designed to match/complement an active area of its corresponding/associated DIPP 110 that produces image constituent signal $115k$. The physical size of the output is not required to match the physical size dimensions of the input—that is, the output may be relatively tapered or expanded, or a circular perimeter input may become a rectilinear perimeter output. Other transformations include repositioning of the signal—while image constituent signal $115_1$ may start in a vicinity of image constituent signal $115_2$, display image primitive $120_1$ produced by channel 135 may be positioned next to a display image primitive $120_x$ produced from a previously "remote" image constituent signal $115_x$. This allows a great flexibility in interleaving signals/primitives separated from the technologies used in their production. This possibility for individual, or collective, physical transformation is an option for each channel of matrix 130.

Channel 140 illustrates a channel having a pair of inputs and a single output (aggregates the pair of inputs). Channel 140 receives two original image constituent signals, signal $115_3$ and signal $115_4$ for example, and produces a single display image primitive $120_2$, for example. Channel 140 allows two amplitudes to be added so that primitive $120_2$ has a greater amplitude than either constituent signal. Channel 140 also allows for an improved timing by interleaving/multiplexing constituent signals; each constituent signal may operate at 30 Hz but the resulting primitive may be operated at 60 Hz, for example.

Channel 145 illustrates a channel having a single input and a pair of outputs (disaggregates the input). Channel 140 receives a single original image constituent signal, signal $115_5$, for example, and produces a pair of display image primitives—primitive $120_3$ and primitive $120_4$. Channel 145 allows a single signal to be reproduced, such as split into two parallel channels having many of the characteristics of the disaggregated signal, except perhaps amplitude. When amplitude is not as desired, as noted above, amplitude may be increased by aggregation and then the disaggregation can result in sufficiently strong signals as demonstrated in others of the representative channels depicted in FIG. 1.

Channel 150 illustrates a channel having three inputs and a single output. Channel 150 is included to emphasize that virtually any number of independent inputs may be aggregated into a processed signal in a single channel for production of a single primitive $120_5$, for example.

Channel 155 illustrates a channel having a single input and three outputs. Channel 150 is included to emphasize that a single channel (and the signal therein) may be disaggregated into virtually any number of independent, but related, outputs and primitives, respectively. Channel 155 is different from channel 145 in another respect—namely the amplitude of primitives 120 produced from the outputs. In channel 145, each amplitude may be split into equal amplitudes (though some disaggregating structures may allow for variable amplitude split). In channel 155, primitive $120_6$ may not equal the amplitude of primitive $120_7$ and $120_8$ (for example, primitive $120_6$ may have an amplitude about twice that of each of primitive $120_7$ and primitive $120_8$ because all signals are not required to be disaggregated at the same node). The first division may result in one-half the signal producing primitive $120_6$ and the resulting one-half signal further divided in half for each of primitive $120_7$ and primitive $120_8$.

Channel 160 illustrates a channel that includes both aggregation of a trio of inputs and disaggregation into a pair of outputs. Channel 160 is included to emphasize that a single channel may include both aggregation of signals and disaggregation of signal. A channel may thus have multiple regions of aggregations and multiple regions of disaggregation as necessary or desirable.

Matrix 130 is thus a signal processor by virtue of the physical and signal characteristic manipulations of processing stage 170 including aggregations and disaggregations.

In some embodiments, matrix 130 may be produced by a precise weaving process of physical structures defining the channels, such as a Jacquard weaving processes for a set of optical fibers that collectively define many thousands to millions of channels.

Broadly, embodiments of the present invention may include an image generation stage (for example, image engine 105) coupled to a primitive generating system (for example, matrix 130). The image generation stage includes a number N of display image primitive precursors 110. Each of the display image primitive precursors $110_i$ generate a corresponding image constituent signal $115_i$. These image constituent signals $115_i$ are input into the primitive generating system. The primitive generating system includes an input stage 165 having M number of input channels (M may equal N but is not required to match—in FIG. 1 for example some signals are not input into matrix 130). An input of an input channel receives an image constituent signal $115_x$ from a single display image primitive precursor $110_x$. In FIG. 1, each input channel has an input and an output, each input channel directing its single original image constituent signal from its input to its output, there being M number of inputs and M number of outputs of input stage 165. The primitive generating system also includes a distribution stage 170 having P number of distribution channels, each distribution channel including an input and an output. Generally M=N and P can vary depending upon the implementation. For some embodiments, P is less than N, for example, P=N/2. In those embodiments, each input of a distribution channel is coupled to a unique pair of outputs from the input channels. For some embodiments, P is greater than N, for example P=N*2. In those embodiments, each output of an input channel is coupled to a unique pair of inputs of the distribution channels. Thus the primitive generating system scales the image constituent signals from the display image primitive precursors—in some cases multiple image constituent signals are combined, as signals, in the distribution channels and other times a single image constituent signal is divided and presented into multiple distribution channels. There are many possible variations of matrix 130, input stage 165, and distribution stage 170.

Figure 2:
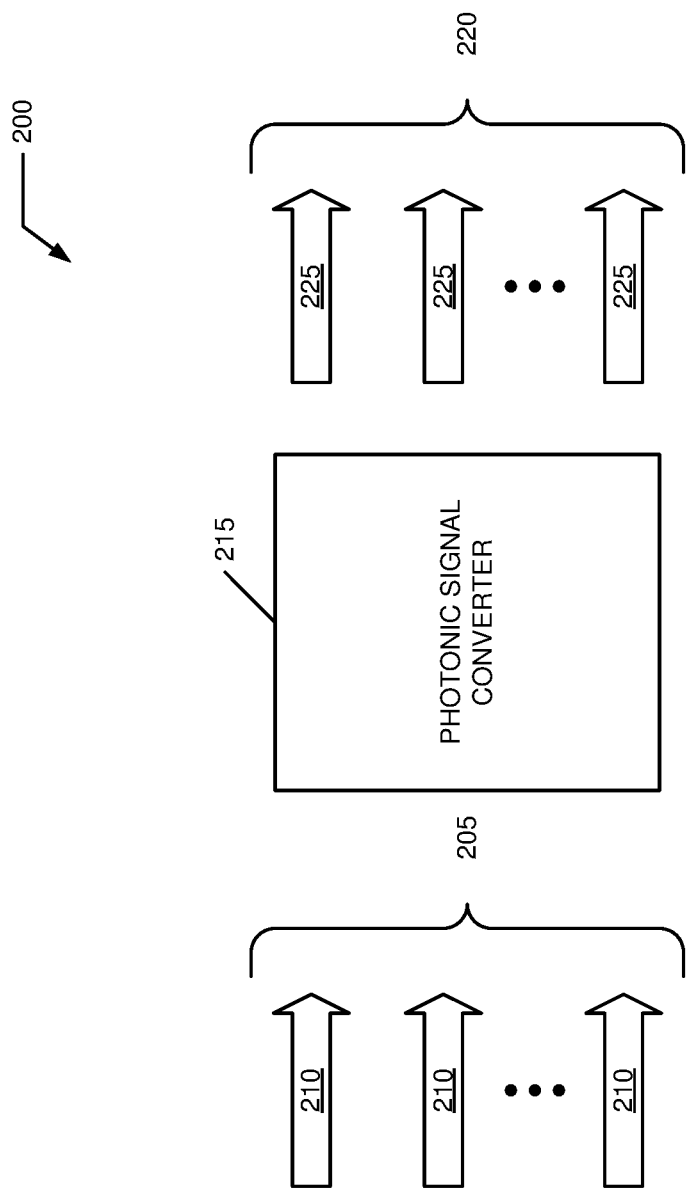
FIG. 2 illustrates an embodiment of a photonic converter implementing a version of the imaging architecture of FIG. 1 using a photonic converter as a signal processor.

FIG. 2 illustrates an embodiment of an imaging system 200 implementing a version of the imaging architecture of FIG. 1. Systems 200 includes a set 205 of encoded signals, such as a plurality of image constituent signals (at IR/near IR frequencies) that are provided to a photonic signal converter 215 that produces a set 220 of digital image primitives 225, preferably at visible frequencies and more particularly at real-world visible imaging frequencies.

Figure 3:
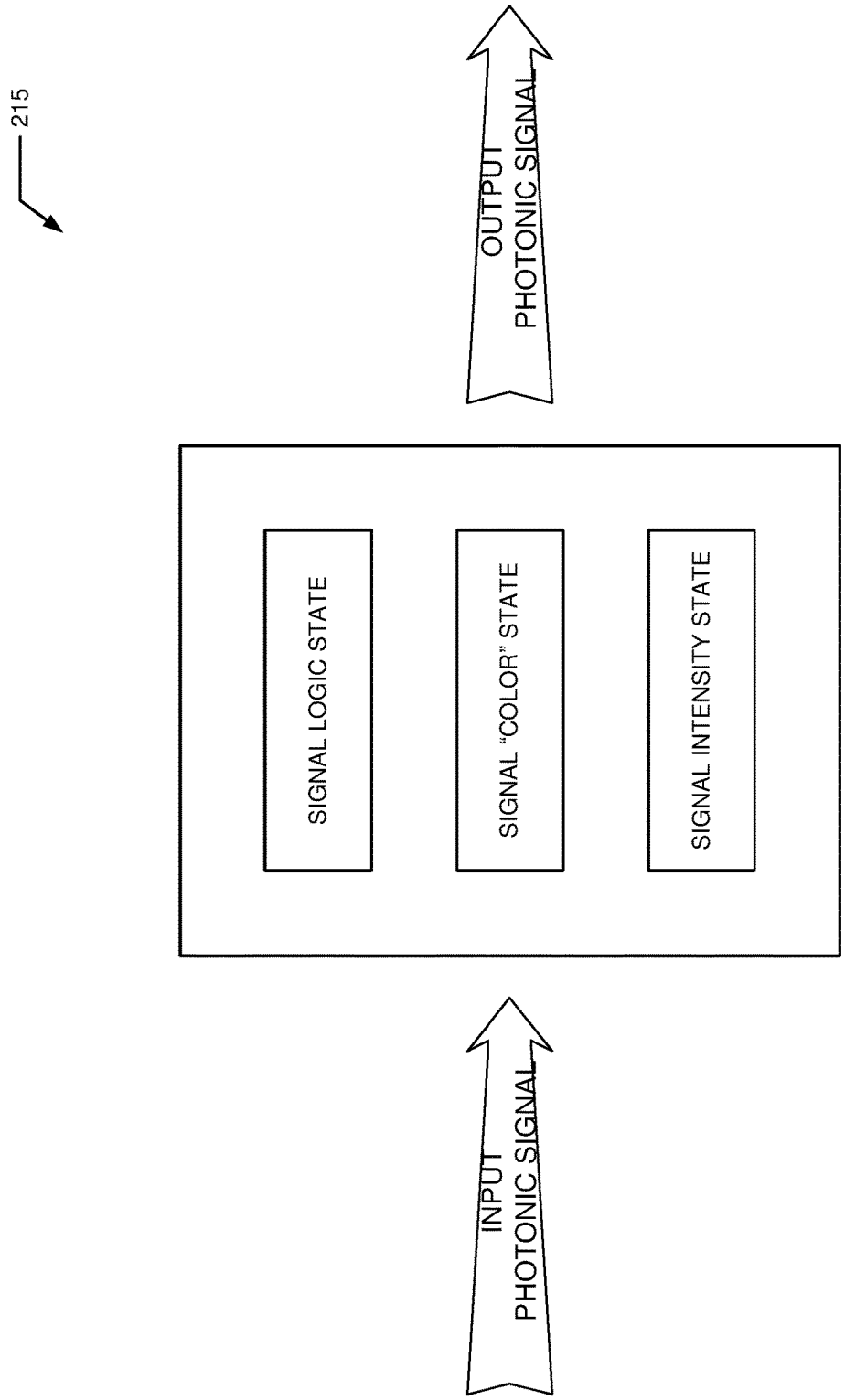
FIG. 3 illustrates a general structure for a photonic converter of FIG. 2.

FIG. 3 illustrates a general structure for photonic signal converter 215 of FIG. 2. Converter 215 receives one or more input photonic signals and produces one or more output photonic signals. Converter 215 adjusts various characteristics of the input photonic signal(s), such as signal logic state (e.g., ON/OFF), signal color state (IR to visible), and/or signal intensity state.

Figure 4:
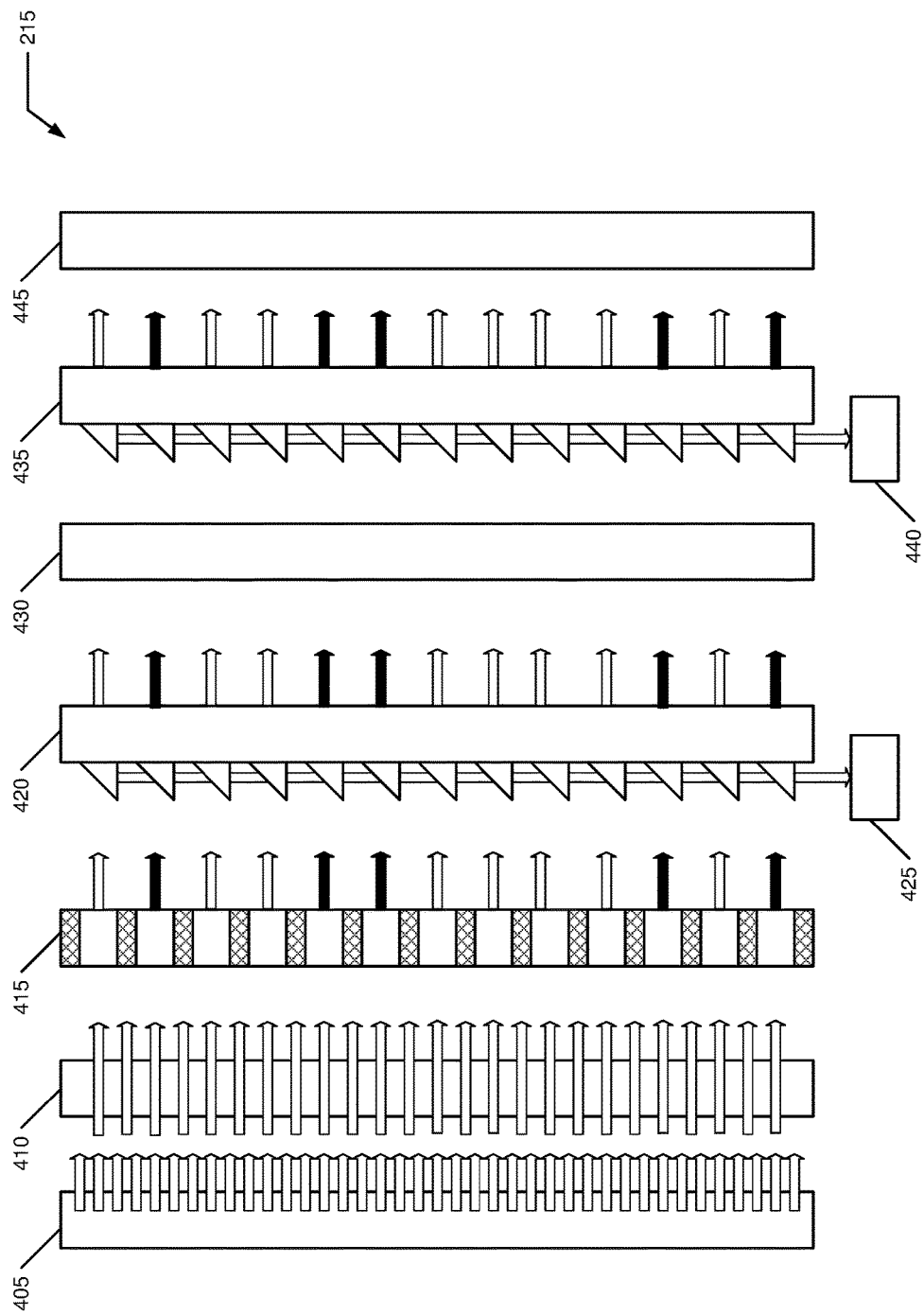
FIG. 4 illustrates a particular embodiment for a photonic converter.

FIG. 4 illustrates a particular embodiment for a photonic converter 400. Converter 405 includes an efficient light source 405. Source 405 may, for example, include an IR and/or near-IR source for optimal modulator performance in subsequent stages (e.g., LED array emitting in IR and/or near-IR). Converter 400 includes an optional bulk optical energy source homogenizer 410. Homogenizer 410 provides a structure to homogenize polarization of light from source 405 when necessary or desirable. Homogenizer 410 may be arranged for active and/or passive homogenization.

Converter 400 next, in an order of light propagation from source 405, includes an encoder 415. Encoder 415 provides logic encoding of light from source 405, that may have been homogenized, to produce encoded signals. Encoder 405 may include hybrid magneto-photonic crystals (MPC), Mach-Zehnder, transmissive valve, and the like. Encoder 415 may include an array or matrix of modulators to set the state of a set of image constituent signals. In this regard, the individual encoder structures may operate equivalent to display image primitive precursors (e.g., pixels and/or sub-pixels, and/or other display optical-energy signal generator.

Converter 400 includes an optional filter 420 such as a polarization filter/analyzer (e.g., photonic crystal dielectric mirror) combined with planar deflection mechanism (e.g., prism array/grating structure(s)).

Converter 400 includes an optional energy recapturer 425 that recaptures energy from source 405 (e.g., IR-near-IR deflected energy) that is deflected by elements of filter 420.

Converter 400 includes an adjuster 430 that modulates/shifts wavelength or frequency of encoded signals produced from encoder 415 (that may have been filtered by filter 420). Adjuster 430 may include phosphors, periodically-poled materials, shocked crystals, and the like.) Adjuster 430 takes IR/near-IR frequencies that are generated/switched and converts them to one or more desired frequencies (e.g., visible frequencies). Adjuster 430 is not required to shift/modulate all input frequencies to the same frequency and may shift/modulate different input frequencies in the IR/near-IR to the same output frequency. Other adjustments are possible.

Converter 400 optionally includes a second filter 435, for example for IR/near-IR energy and may then optionally include a second energy recapturer 440. Filter 435 may include photonic crystal dielectric mirror) combined with planar deflection structure (e.g., prism array/grating structure(s)).

Converter 400 may also include an optional amplifier/gain adjustment 445 for adjusting a one or more parameters (e.g., increasing a signal amplitude of encoded, optionally filtered, and frequency shifted signal). Other, or additional, signal parameters may be adjusted by adjustment 445.

Figure 5:
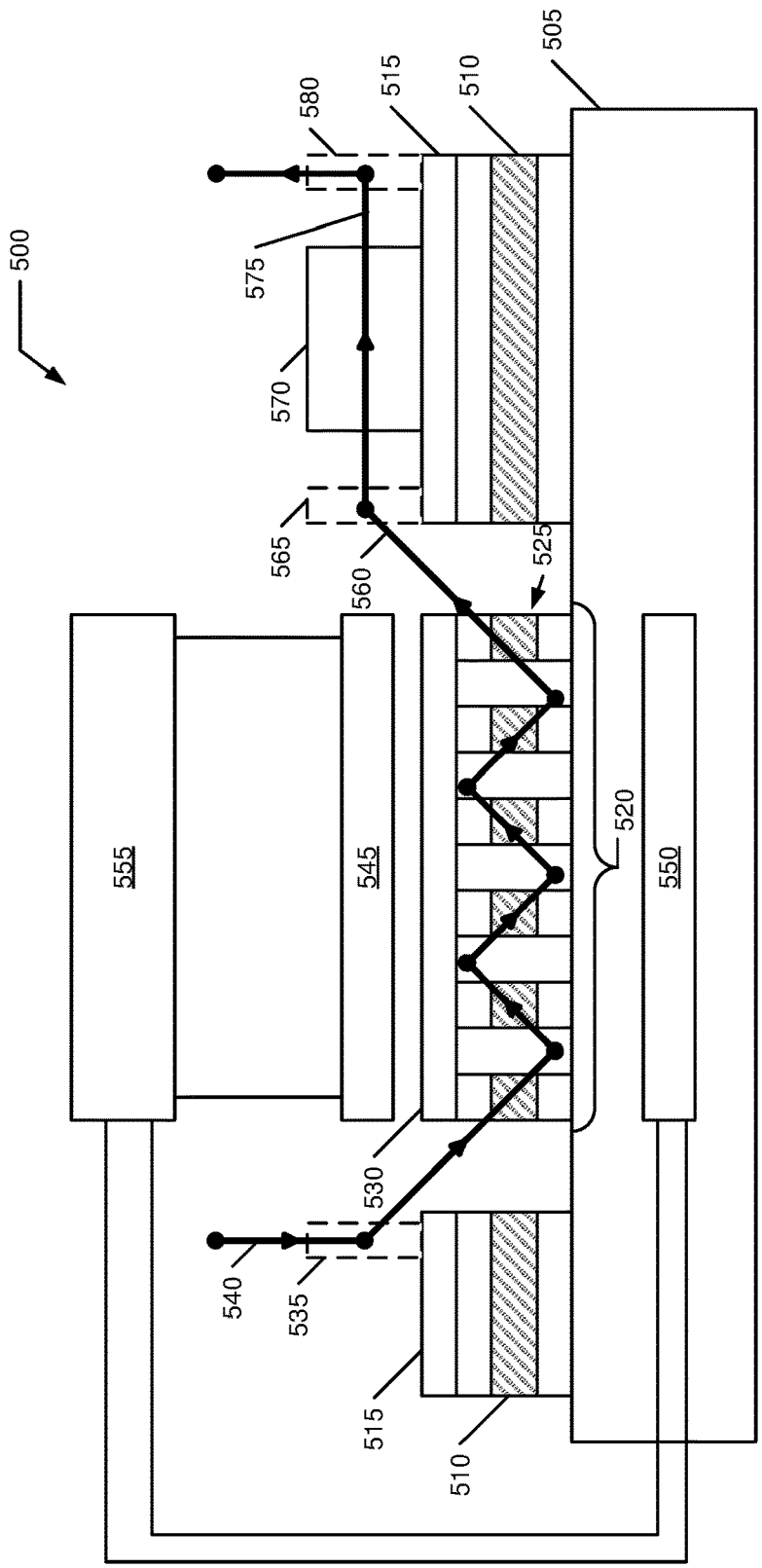
FIG. 5 illustrates a side view of a magneto photonic encoder which may be used in the encoder of FIG. 4.
Figure 6:
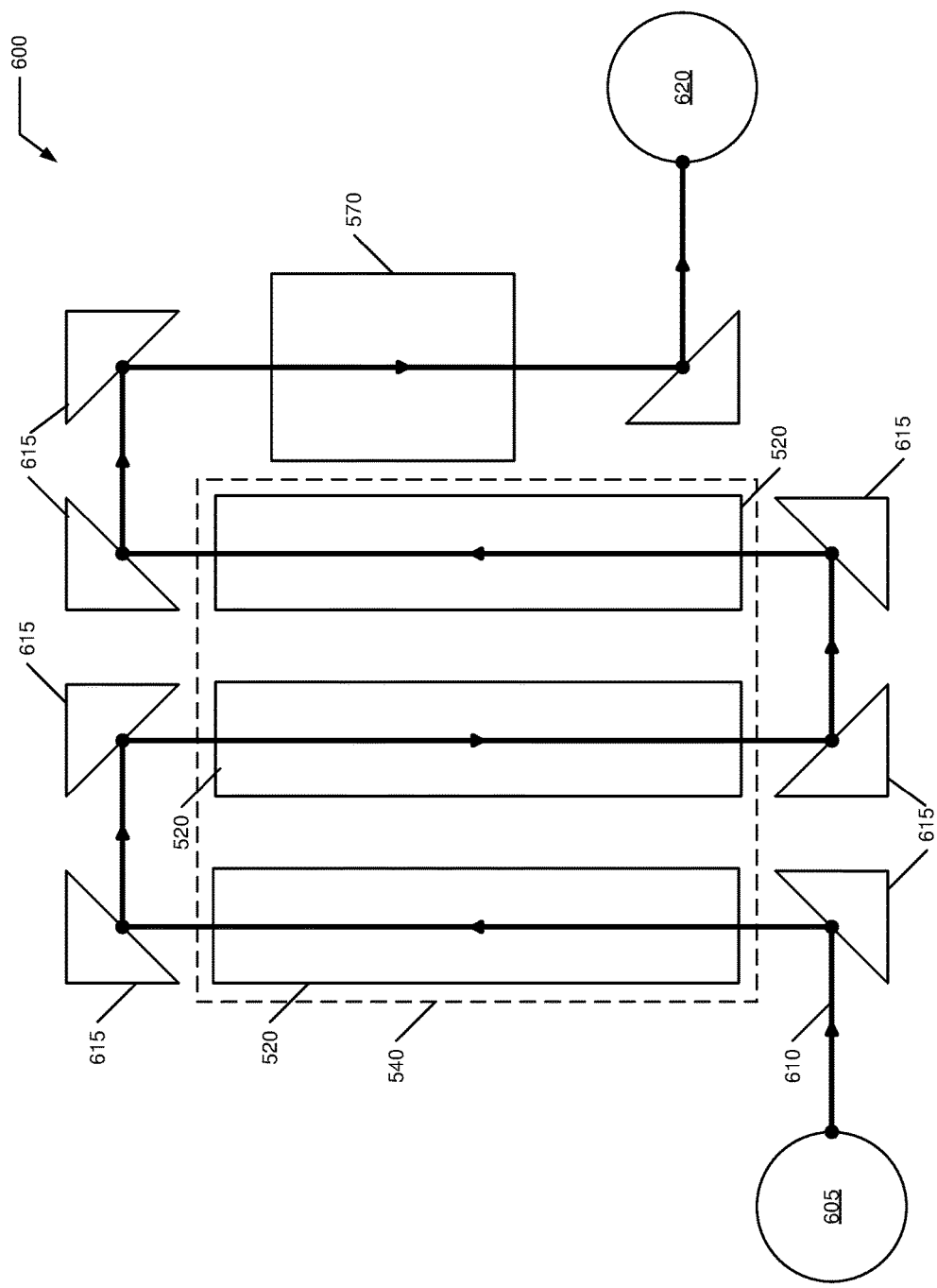
FIG. 6 illustrates a top view of a magneto photonic encoder.

FIG. 5 illustrates a side view of a magneto photonic encoder (MPE) 500 which may be used in encoder 420 of FIG. 4. FIG. 6 illustrates a top view of one of many different possible arrangements of the components of MPE 500 as an MPE 600. FIG. 5 and FIG. 6 are not necessarily views of the same MPE, however an MPE may include features illustrated in either/both of FIG. 5 and FIG. 6.

MPE 500 includes a substrate 505 supporting a one dimensional multilayer magneto photonic crystal (MPC) 510 and a protective layer 515. MPC 510 may be deposited or grown on substrate 505. MPC 510 includes an encoding region 520 that includes a set of periodic MPC structures 525. A reflective layer 530 overlies region 520 rather than protective layer 515.

A first path-optic 535 directs a beam of light 540 into encoding region 520 at an angle for total internal reflection so that the beam of light propagates through encoding region 520. A first mechanism 545 is associated with encoding region 520 that, along with an optional second mechanism 550 disposed within substrate 505, produces a controllable magnetic field that, in turn, controllably rotates a polarization of the propagating beam of light 540 within encoding region 520. A controller 555 controls the magnetic field B applied to encoding region 520 by first mechanism 545 and second mechanism 550.

At the end of encoding region 520, the polarization-modified beam of light 560 exits and is directed into a second path-optic 565 that in turn directs the polarization-modified beam of light 560 into a non-reciprocal-mode conversion device 570 to produce an encoded beam of light 575 that is directed to a third path-optic 580.

The path optics are structures or defects that steer the beam of light as desired and may be implemented as, for example, a prism, point defect, or the like). MPE 500 is a planar device and beams of light are directed into and out of the plane by path optics.

In operation, MPE 500 uses Faraday effects and an optical constant (Verdet) of the periodic MPC structures, responsive to the magnetic field produced from first mechanism 545 (along with second mechanism 550 when present) to controllably set a polarization rotation of the beam of light propagating through encoding region 520. The polarization rotation interacts with device 570 to set a transmissive amplitude of beam of light 560 which may be used to encode beam of light 575 (e.g., ON or OFF). Note that this illustrated embodiment does not include a set of crossed polarizers that are often used with Faraday effect devices because of device 570. One feature of MPE 500 is a footprint of each encoding region 520 may be made compact to allow a matrix/array of encoders to be efficiently packed. An arrangement of components as illustrated in FIG. 6 explains one possible packing arrangement.

MPE 600 includes a first coupling mechanism 605 that directs light beams from out-of-plane into an in-plane light beam 610 using one or more path optics 615. A set of encoding regions 520 are arranged into a series of switchbacks using various appropriately positioned path optics 615 to route beam 610 repeatedly through the set of encoding regions 520 and then into device 570. First mechanism 540 is illustrated as overlying all encoding regions 520 to apply the controlling magnetic field.

The encoding regions 520 set a polarization of beam 610 that interacts with device 570 to controllably set an amplitude level (e.g., encode) the beam of light as it exits from device 570. A second coupling mechanism 620 directs the encoded signal out-of-plane for use. MPE 600 may serve as a single digital image primitive precursor producing a single image constituent signal (e.g., the encoded signal exiting from device 570).

The following details the improved versions of the telecom-type and structured, pixel-signal processing display system originally disclosed in co-pending application, as well as improved versions of key components and new configurations and applications of said telecom-type and structured, pixel-signal processing display system and related SLM-type data-processing system.

In specific design solutions and embodiments implementing the system of the present disclosure and co-pending disclosure, there is a trade-off between obtaining efficiency gains (and in many cases, any valuable functionality at all) by de-composing the pixel signal processing system (or signal processing system) systematically so that operations on frequencies by devices are performed in frequencies optimal to the materials system and device design.

There is added complexity and cost that in some (but not all) cases are optional and therefore added to the overall system; and there are typically (but not always) power and in some cases performance (degrading of some other signal characteristic) losses because of the de-composing of the signal processing sequence into optimized, division-of-labor components.

These "costs" must be considered in any particular implementation to guide the specific number, sequence, and degree of magnitude of frequency-modulation/shifting and other discrete signal-modification stages to be employed in any overall system.

However, because the gains can be so significant (e.g., a certain physical effect can "only" be obtained at a non-visible frequency) and thus the gains from the efficiency of that method are significant to enormous from the standpoint of the overall system, the range of opportunity opened up by this new, systematic approach to pixel signal processing system (or other photonic/opto-electronic signal processing system) is quite startling and very significant indeed.

The opportunity to separate operations and device types may be assumed to propose significant spatial separation of the stages and devices, enabling many novel physical architectures for displays and projections in which the basic pixel-state signal is originated remotely and distributed to the following stages over a broad-band telecommunications network. This is an important novel and preferred embodiment and feature of the present disclosure, essentially a "direct-display-data" distribution to relatively "dumb" frequency/wavelength modulation and intensity modulation stages (ultimately, using passive materials). Significant intermediate signal processing for image display purposes may be eliminated by fiber-to-display architectures in which the raw light-pulse packet data contains subpixel-address information as a subset of local device SSID. Routed only to subpixels which are "on", for video-on-demand and other data-intensive video-streaming applications such as telepresence, total network speeds and local device speeds will increase substantially by shedding unneeded intermediate data and signal processing operations.

As a variation and adjunct to this overall scheme, local (building-level or room-level) specialized video-signal routers/servers may be employed to distribute video signal, employing telecommunications, photonic, and fiber-optic signal processing methods and devices known to the art, including DWDM (dense wave-division multiplexing), to relatively "dumb" display and projection fixtures in a given building or room. Such protocols and specializations can be applied at all scales of direct video-signal distribution, from metro to long-distance.

It is a major purpose of the present disclosure to in fact propose a configuration of the new type of pixel-processing, distribution and display network which is in particular a DWDM-type system and significantly compatible with existing DWDM architectures, substantially eliminating the need for optical-to-electronic conversion for and at the final user end for image data, accelerating the advent of all-optical networks, enabling a practical "pixel-signal processing" server farm that sends final screen frames on an "image rendering/cloud server" architecture, and which includes conversion/formatting of sequential and/or optical fiber spatially batch-allocated pixel signal subsets for quasi-direct image transmission over telecom (and local-network) distances—again, compatible with existing Internet/telecom systems with relatively minor modifications While such separation of operations and device types enables this important feature and display broadband network signal processing architecture, this does not mean that the operations, processing stages and devices must be physically separated or established or be part of a highly-distributed video-signal processing network and architecture as proposed above.

In fact, optimized devices which perform the dedicated, de-composed signal-processing stages that ultimately realize a final, viewable subpixel or pixel, may be physically juxtaposed in close intimacy, and as extremely small device features of photonic integrated circuit devices or as physically adjacent or bonded devices with many processing elements fabricated in arrays. Wafer and photonic textile versions are contemplated, with photonic textiles or "optical fabrics" being a structural form particularly compatible with the present disclosure. Such systems are proposed by the inventor of the present disclosure in the incorporated patent applications.

A preferred embodiment, at a high level, of the proposed "de-composed" pixel-modulation process where the elements of pixel modulation are performed by discrete, separate stages, device, and operations:

The three primary or typical processing stages for a de-composed, discrete signal processing architecture for generating final, viewable pixel or sub-pixel signals are: state (pixel-logic); frequency or wavelength modulation; and intensity modulation. It is an essential object of the present proposal that this "division of labor" or de-composing of the elements of pixel-modulation is directed so that each stage is optimized, with optimum use of materials and methods at each stage, as opposed to the compromises typically found under an integrated device approach.

Materials that realize the most efficient state-change switching for many modulators, including switching speed and absorption, typically operate at telecom-wavelengths, so that modulating at those wavelengths will be the most efficient for the performance of that component of the total pixel modulation task. Frequency shifting the output from this stage with a subsequent stage provides for a method of optimizing state modulation with the optimal materials and methods, leaving frequency modulation (including for color bandwidth enhancement) to other methods and materials optimized for color output.

In addition, the same materials and methods employed in these two stages, while efficient and low-absorption within an optimal operating range, may be limited in the total amount of optical energy throughput. Thus, an intensity modulation stage, typically employed to amplify the signal, will be employed, using materials and methods optimized for that task.

Intensity modulation has other applications as well. In a pixel-color system in which a subpixel itself may vary intensity, instead of only possessing an on or off state, in addition to the on/off state data of the pixel-logic gate or modulator, a second variable, the intensity variable, is paired with the binary on-off state data. This may be carried as an optical signal with the base on-off signal through to the intensity modulation stage, which is triggered only if the base on-off signal is "on" but which "reads" the intensity level and responds by variably amplifying the signal appropriately. Or, in an opto-electronic device variant, the on-off pixel-logic "gate" state is electronically-addressed to that first device in the series, and the intensity state is electronically-addressed to the intensity modulation device and stage, only if the first stage is addressed "on."

Among the preferred pixel-logic modulation devices and methods in preferred embodiments of the proposed system are two of the best-in-breed modulation methods found in photonic integrated circuits, photonics and telecommunications signal processing generally. According to the principle of the present disclosure, the pixel-state modulation method is chosen to be optimized for all switching characteristics irrespective of operating frequency. Thus, two of the most preferred methods for use in the present disclosure, and as part of the novel image display and projection system of the present disclosure, are Mach-Zehnder modulators and magneto-optic and magneto-photonic modulators.

An improved hybrid telecom-type display system, which may be configured in both "proximate" and "remote" configurations as summarized above and disclosed in the previously referenced co-pending application, is disclosed as follows:

I] Pixel-Signal Processing System Description:

Encompassing therefore both earlier MO-based devices as well as the improved devices disclosed herein, the present disclosure proposes a telecom-type or telecom-structured, pixel-signal processing system of the following process-flow of pixel signal processing (or, equally, PIC, sensor, or telecom signal processing) stages and thus, architectures (and variants thereof) characterizing the system of the present disclosure:

1. Illumination Source Stage:

a. In a preferred embodiment of the present system, the illumination source inputs non-visible light into the channels (input to wave-guiding/path control structures) of the pixel-signal processing (or signal-processing) system. In another embodiment, the illumination source may be a combination of visible and non-visible or solely visible light; and if visible light, the source may or may not be composed of color spectra proportions the same as the designed final pixel signal and image display output. Preferred sources may include LED, laser, hybrids of LED and laser, FIPEL (field-induced electroluminescence) and hybrids of FIPEL; less preferred are other conventional lighting sources, such as incandescent, halogen, fluorescent, etc., except where they may be combined with collimating and/or coherence optics or opto-electronics stages to realize source illumination of a more collimated or coherent character for those embodiments and variations of the present disclosure for which the pixel (or other) signal is either more efficiently processed (or can only be processed) by a pixel-signal (or other signal) processing stage which operates optimally or only on such light.

Hybrid combinations of light source types may be chosen to match and optimize intensity peaks per frequency with optimal processing parameters of subsequent stage of the pixel-signal processing sequence(s) of the present disclosure.

b. Non-visible (near-IR) source is proposed as preferred because of the fact that a majority of photonic and opto-electronic device technologies perform their wave/signal modification operations in the range of IR through visible red, and in part because illumination input of a non-visible light source allows for embodiments of the present disclosure in which the bulk source may be always "on" (as long as the system power is on or the display portion active and not in a standby mode) and non-visible light may be encoded as 0 (and thus "no pixel illumination at any level" or "black") and no operation of the subsequent pixel signal logic operation on the beam, which then ("black") may EITHER pass completely down a channel to the output pixel and to the HVS and be "invisible" to the HVS and thus fully "black" or off (making for superior contrast as compared to any other display system in which the default channel is a visible channel that must be blocked in effect by a light-valve or emissive pixel which is a photo emitter/excitor (such as an OLED display or plasma cell) which has a less-than-absolute black decay-to state in operating mode), AND/OR (to the degree of recovery efficiency) an optional recovery stage (SEE BELOW) for channels with input illumination that has not been set to a non-zero pixel logic state, in which the signal is "read" by a efficient filter (photonic crystal) and the signal diverted to a photon absorbing device (such as a photo-voltaic cell.) Such diversion may be a planar grating structure to convey non-visible light along the plane of the filter to an optical collector means along the edge(s) and from there by a optical guiding means (waveguides, holes, etc.) to a consolidated photo-voltaic or other optical energy device for converting photonic energy to electron flow. While optional for the preferred element configuration of the present system disclosure, the benefit of using non-visible source illumination and employing a passive frequency-shifting means to recover the optical energy when "black" is potentially significant.

c. Preferred Polarization Mode Management Stage, with preferred Polarization Mode Conversion and Consolidation/Harmonization Stage of the Illumination Source Stage: In systems of the present disclosure in which the following pixel-logic processing type involves operation on the polarization type/vector property of the input signal, a modification of the illumination source stage is one in which either the source is constrained to supply light of a given polarization characteristic in the nature of its emission/generation system, or the "illumination source" actually consists of an illumination source outputting light of mixed polarization properties, but then the light is sorted/split into polarization types, using polarization splitters, and then "in bulk" those "arms"/channels are subjected to passive rotation (preferably, such as a half-wave plates and/or quarter-wave plates). Depending on the illumination source type and its own geometry, bulk illumination can be:

i. concentrated and split, separated and sorted using either bulk polarization filters (such as efficient nano-grating filters) and then each separated channel guided/directed through consolidated quarter- and/or half-wave plate crystal structures or zones, with the previously separated/sorted (by polarization type) channels then recombined as one homogenized output and thus consolidated into one much more efficient but polarization converted illumination output source; or then it may be either 1. filtered in bulk as before but and then inserted or directly into self-filtering polarization-maintaining optical fibers and then passed in concentrated/bulk form through the appropriate quarter- or half-wave plate(s), either integrated in-fiber or as a discrete optical element(s) for one or more fiber channels (with fiber channels allowing the physical separation and thermal insulation from the original undifferentiated illumination emission/output);

2. or inserted/coupled directly into optical fiber(s) or other discrete optical coupling channels that are self-filtering and polarization-maintaining over the transport distance required by any given overall system configuration ii. Where concentrating illumination is not practical, due to thermal effects of concentrated optical energy or mechanical configuration requirements of the lighting unit or some other reason, more diffuse illumination catchment stage and area (cavity(s)) may be employed for the sorting/passive polarization conversion stages: at one end(s) of a lighting cavity is input relatively undifferentiated light, and for at least one other face of said cavity are disposed composite sheets or layers, the facing or input layer being first in sequence and onto which or into which are fabricated polarization filtering structures, such as gratings, and preferably in the form of many small and alternating gratings patches for each polarization mode, forming a grid of such alternating filter structures, each of which only allow polarized light of a given type to pass; and this layer followed by, bonded to, or otherwise assembled with sheets where for all polarization grating patches of on the first sheet, all but the selected one or more required or optimal polarization modes will be faced with a matching/appropriate quarter-wave or half-wave "plate" of bi-refringent crystals, which are formed/grown on the sheet or layer (such as by low/room temperature crystal growth and deposited by "printing" nano-materials in an "ink-jet"-type system, or embossing periodic structures on a blank from a master) on the quarter/ half-wave "plate" sheet(s) arranged in appropriate geometries. Bi-refringent crystals may be grown or fabricated on relatively planar surfaces according to the multiple methods know to the art, or methods still to be invented, whichever may meet the best combination of cost and efficiency for a given overall system configuration.

d. Other passive polarization-converting materials or structures may be used along with or instead of bi-refringent crystals.

e. Alternatively, active polarization converting methods may be used along with or instead of passive structures, such as bulk Faraday-effect-based devices (rotators) and/or magneto-optic Kerr effect devices.

f. In another preferred embodiment, the input light is input to the next stage and operation of the system in the visible red band. Many devices which perform best in IR and/or near-IR also perform nearly as well in the visible red band. This option may be preferable from a fabrication and operating cost standard (see "holistic" design considerations above), so that only Green and Blue frequencies require frequency/wavelength modulation/shifting after the pixel-logic encoding stage (next).

g. Other versions supply light in a combination of IR, near-IR, and visible bands selected to match a designated "best fit" operating range of a given device/materials system for final R, G and B output (and/or RGB of differing polarization or other modes, etc.) and operating stage of the overall pixel-signal (and non-pixel data-array) system. "Best Fit" may not equal the optimal operating frequency range of a given device and related materials system, but rather reflects a frequency band selection based on more "holistic" design considerations (referenced earlier herein) of the fabrication complexity and manufacturing and operating cost of a system encompassing (often, but not always) more optimized, discrete pixel signal processing stages than may be found in more conventional display technologies and systems.

An example of such a "best fit" system might be one that supplies, from the illumination unit, red-band light to red pixels, and then up-converts and provides green of a very narrow band to the green pixels and another green of a very narrow band to the blue pixels. Pixel-logic encoding (state encoding) will then be performed on these "compromise" frequencies of convenience, because while not matching the final color gamut and spectra requirements of the final viewable pixels, the pixel-logic processing devices/materials system at least work better at those frequencies than a broad-band green or any blue.

Then, in this hypothetical example, the output from the red pixel-logic encoding device/stage may require band-broadening afterwards, utilizing one or a combination of the materials/device technologies (or others of similar operative effect) described below, such as use of quantum dots at some later stage in the sub-pixel channel; while the final green pixels may also require band-broadening, but requiring a different materials composition; and for the blue pixels, a second up-conversion stage may be required, shifting/modulating/up-converting from green to blue, utilizing again one of the listed methods or others of similar operative effect, such as a periodically-poled materials system implementing QPM, the output from which may then require a band-broadening process stage, again for instance via the spectral broadening effects of quantum dot technology.

2. Pixel-logic processing: receiving the input appropriately "polarization homogenized" light, a magneto-optic or hybrid magneto-optic device effect and operation (modification of raw, unprocessed input signal) on the light, typically in a binary 0-1 regime, which can be on-off or separable ends of a continua range (polarization state within given cutoff ranges serving as 0 and 1, frequency/wavelength states carrying the status of 0 or 1, and alternatively encoding the input light through other encoding systems of other bases (e.g., quantized base 8, 13, etc.) and in these cases the encoding consists in set predefined bands or operating ranges of a wave characteristic for a given value in the base.

The higher the base system, the more the encoding system supports a variable-intensity (brightness) coding regime. Given sufficiently refined tune-ability of such higher-base systems, extremely high-contrast illumination systems with thousands of gradations may be implemented. Typically, though, a pixel-logic (or more completely, pixel-state logic) stage and encoding is implemented in a binary system.

Magnetic "latch-ability" may also be implemented for binary systems as bi-stable switch, but may also be implemented, at discrete bands of field strength and/or sub-sectors of a given sub-pixel domain structure, in higher-base encoding systems.

In a magneto-optic Faraday-effect-type pixel logic encoder or a magneto-optic Kerr-effect type encoder, it is not necessary for the logic state even in a binary system to yet equate to a complete light valve operation, i.e., on and off, as the completion of that function may be implemented by a polarization filter or capture stage further along in the pixel-signal processing sequence. It is sufficient only that the signal characteristic state be encoded at this stage. A pixel-logic operating device based on a classical MO effect which changes a polarization parameter magnitude and which also functions as a complete light valve may be said to both "write" (encode a state) and "read" (an analyzer) the pixel signal logic in the same stage; an alternate device, which encodes only ("writes") is sufficient to implement the function of encoding the pixel-signal (or photonic or opto-electronic state signal) on the input illumination.

Novel pixel-signal logic encoders are further disclosed subsequent to this mapping of the pixel-signal-processing sequence(s).

In the present disclosure, whose focus is on MO-type devices implementing pixel-logic encoding, it is also evident that Mach-Zehnder interferometer (or related Michelson interferometer)-type optical switches may in fact be the "primary" or even only operative pixel-logic encoder and function essentially the same in an overall architecture of pixel-signal processing as provided for in the improved and detailed proposal of the present disclosure, as well as in the overall proposals of the incorporated patent applications. There are constant improvements in the field of Mach-Zehnder interferometer-type switches, including "all-optical" switches, such as the new work reported by Glesk et al, Optics Express, Vol. 19, Issue 15, pp. 14031-14039 (2011)

MO-based and MZ and related interferometric devices find opportunities for robust hybrid system co-location and/or sequential operation and modification of pixel signal and of implementation in an efficient division of labor de-composed pixel-signal and photonic and opto-electronic signal processing system.

3. Optional Non-visible optical energy filter and optical-energy recovery stage:

For those versions of the present disclosure employing non-visible light especially, an optional stage comprising of a non-visible filter, and preferably a non-visible deflector/collector means combined with an energy recovery means, is proposed.

Further expanding on the parallel proposal of the co-pending application, while efficient filters realized by means of "perfect dielectric mirror" technology (OmniGuide, inc.), which is a particular photonic crystal technology most widely implemented by OmniGuide for fiber-device based surgical systems are not a differing proposal from the co-pending application.

However, a novel and improved method for capture and collection and routing to energy recapture means is proposed as follows:

A periodic grating structure tuned to the non-visible bands is fabricated by one of the many means commercially available or yet to realized to the art on an optical substrate transparent to visible frequencies. These grating structures, whose tuning may be realized by commercial fast-Fourier transform based photonic crystal modeling and simulation software, (similar in genus to the software previous used in programs cited in the present disclosure that designed successful new photonic crystal materials), deflect any non-visible light from pixels not encoded as non-zero by the pixel logic encoding stage/means.

Alternatively, a modified version of gratings structures implementing holographic elements (HOE's), such as those developed by Lumus or BAE, which divert input illumination along the plane of the optical element, may be employed.

Any periodic structure, as is now known to the art, may be employed that accepts input illumination and diverts said illumination to one of the (relative to the optical axis and) plan/faces of the optical substrate, with the result that the diverted non-visible light is recaptured by recapture means disposed at the relative sides. Such recapture means may be photon-electron conversion, such as photo-voltaic, or simply an optical channel collector which routes unused non-visible signal via optical fiber back to the illumination unit for re-insertion into the head of the pixel-signal processing sequence.

4. OPTIONAL SIGNAL MODIFICATION STAGES FOR IMPROVING/ALTERING THE FOLLOWING PIXEL-SIGNAL CHARACTERISTICS, among others:

a. splitting of a percentage of signal and delaying the phase of that signal-portion to provide encoding of holographic-type pixel information or to delay the propagation of that portion of the signal for other reasons, such as dividing up a pixel set for sequential high-speed transmission rather than simultaneous transmission, or phase-delaying an "entire" sub-pixel or pixel or sub-component of same for the same purposes, or others;

b. splitting of polarization modes and alteration of separated channels/modes to provide encoding of dimensional display information such as holographic or stereo pixel information.

It is noted at this point that an optional configuration of the illumination stage, polarization mode management, is to separate the light into modes but only convert and consolidate when necessary.

When this version is implemented, then this optional stage, which is a polarization encoding stage, can be facilitated in terms of overall system design by implementing the sorting of raw source illumination into desired polarization modes and channels at the illumination stage and prior to the pixel-logic encoding stage.

Whether sorting is better before the pixel-logic encoding stage or afterwards will significantly depend on the type of encoding device(s) and effects employed, in terms of what is required for the optimal operation of those devices vs. what is required to deliver a subpixel sub-component or pixel component for subsequent device/stage processing requirements, such as what may be required for holographic image reconstruction purposes. What may be optimal polarization mode inputs for a hybrid MO-type pixel logic encoder may not be optimal for the needs of devices required for a holographic or other specialized display system, of for the human visual system which must process the final output light and integrate pixel/sub-pixels and subcomponents thereof as "images."

While these stages are not required to happen prior to the preferred frequency/wavelength modulation/shifting (typically, up-conversion) stage, or prior to the optional intensity/power augmentation or "signal gain" stage, the preferred or most common embodiment of the de-composed, pixel-signal processing system (or photonic/opto-electronic signal processing system) will see these optional signal modification stages operate on non-visible signal for the same reason that most photonic or opto-electronic devices function best at these "telecom" wavelengths, due to wavelength-dependence of the performance of the materials employed for the effect desired.

However, in the case where there is a signal amplification/gain stage, the benefit of that type of configuration is in part the efficiency gains from conducting wave modification operations on a lower-intensity signal.

This will reduce heat and degradation of most device types.

It further allows, particularly in cases in which pixel signals are to be transported over long distance in the "remote" (vs. "proximate") spatial-network embodiments of the present disclosure and of the incorporated disclosures, as will be evident in the subsequent optional stage below, "DWDM-type system conversion/formatting of sequential pixel signal sets for direct image transmission over telecom (and local-network) distances compatible with existing telecom systems with minor modifications."

Methods for category "a" above—phase/time delay of a portion or all of a pixel-signal, sub-pixel-signal, or component thereof:

Preferred methods for realizing a signal delay may vary depending on the purpose and final application.

For display systems such as holographic display systems, in which it may be advantageous to split a signal and delay one portion, an MZ-interferometer type device may be most optimal.

For display systems requiring potentially longer delays, other "slow-light" techniques (photon blockades, etc.) will be more appropriate.

This consideration may favor such techniques over MZ or other more conventional interferometric techniques for the implementation of the optional later stage of pixel signal processing (and overall system configuration criteria), "DWDM-type system conversion/formatting of sequential pixel signal sets for direct image transmission over telecom (and local-network) distances compatible with existing telecom systems with minor modifications."

Methods for category "b" above:

Reference is made here to the procedures, structures and methods, both passive and active, described in the optional part 2, Polarization Mode Management, of Stage One, Illumination Source, which may be employed for the purposes of splitting and modification of polarization modes.

5. Frequency/wavelength modulation/shifting and additional bandwidth and peak intensity management In the preferred embodiment of the present disclosure, as well as of the generalized disclosure of cited co-pending application, pixel signal logic and encoding is performed on non-visible source illumination.

Among the established and emerging methods for efficiently performing this key stage that must follow pixel logic encoding of non-visible signal/light are:

a. Phosphor-type absorption-emission "up-conversion" (or down conversion, if input signal happens to be non-visible in the ultra-violet range, etc.).

Phosphors in display applications have a history going back to the first practical display technology, the cathode ray tube.

Phosphors will glow when stimulated by input energy, including from particle stimulation or photon stimulation.

Response times of compositions, determined by the relaxation response characteristic, can be tuned from nanoseconds to minutes in duration.

Thus, making phosphor-based frequency/wavelength modulation/shifting an effective pairing with high-speed (sub 10 ns, and potentially sub 1 ns) MO/MPC pixel logic encoding.

Combined response times can be effectively tuned to the exact system requirements, far in excess of the requirements of the human visual system, with a maximum requirement that is widely established as 60 fps/eye.

For non-display applications requiring frequency shifting, such as for DWDM, and for the optional stage and configuration of the present pixel-signal processing system "DWDM-type system conversion/formatting of sequential pixel signal sets for direct image transmission over telecom (and local-network) distances compatible with existing telecom systems with minor modifications," the higher switching speeds, in excess of 1000× faster than DMD SLM's, provides sufficient modulation speed to implement extremely high-density multi-channel signal Commercial phosphor materials have been developed and optimized for up-conversion from near-IR and IR photon stimulation, to efficiently produce emitted frequencies across the visible spectrum.

Improvements in up-converting phosphor performance is exemplified by work such as that reported by Parma et al, Journal of Luminescence, Volume 130, Issue 12, December 2010, "Structural and photoluminescence properties of $ZrO_2:Eu^{3+}$@$SiO_2$ nano-phosphors as a function of annealing temperature."

Illustrating the range of nano-technology methods being applied to the improvement of up-converting phosphor materials, in US patent application 20100103504, Lawandy discloses "Nano-antenna Enhanced IR Up-conversion materials" in which (synthetic meta-material-type) nano-antenna structures are embedded in compositions to enhance the efficiency and frequency range of IR-excited nano-phosphor materials.

The spectral response, for increased color gamut per unit power input, of phosphor materials may be further improved by the addition of "quantum dot" materials as is commercially supplied by QD Vision, Inc.

b. Periodically-poled Quasi-phase Matched Structures and Devices, e.g., PPLN (periodically-poled lithium niobate), Ti-diffused PPLN, PPKTP (periodically poled potassium titanyl phosphate), etc.

Periodically-poled quasi-phase-matching devices and technologies are arguably the backbone of laser frequency up and down conversion for non-telecom wavelength/frequency modification, as well as for most display applications employing coherent laser lighting as the lighting source.

In the context of display applications, there is a crucial distinction here between the order of operations and principle, a well as benefits, of the present disclosure vs. the conventional display systems employing laser illumination which are required to furnish white (R, G & B) light in such display systems (typically projection systems, but also for some micro-displays in handheld and portable device form-factors) which employ laser illumination sources, because in all such systems the up-conversion occurs prior to the pixel-switching operations, such as in the MEMS (including DMD, DMS, TMOS, GLV) and LCoS type chip-scale/very small micro-displays where a bulk visible light input will be furnished to an entire display array.

This is not chosen as a more-optimal order of operations, in which the optimal stage of frequency/wavelength modulation/shifting is chosen based on consideration of the operating (including thermal absorption) considerations of the micro-display, but rather the default and conventionally obvious design choice for systems in which the default assumption is that a normally-balanced white light be furnished to the display device. This is the default configuration until and prior to the conception of the generalized telecom-type and structured pixel-signal processing system of the present disclosure. The display device in these considerations is solely conceived of as the DMD or LCoS device and its pixel switching functionality.

In this respect, LCoS systems are no different from, and are simply variants of, the larger category of LC-based display systems, and in all such devices there is a backlight/input balanced white light and the display acts on visible light input for visible light display applications.

In specialized applications such as very high brightness, high-resolution digital cinema projector systems, multiple LCoS-type chips will be employed, but each will be supplied a bulk visible light source, one each for R, G, and B, such that the three LCoS devices will generate three images, one R, G, and B, which will be optically over-laid or superimposed on each other to form a bulk-combined full-color image.

Reversing the normal order of operation and normal use of periodically-poled materials and devices with what we call "pixel logic (or signal or state) encoding (or processing) reflects an entirely different system-level conception of what a display is. It is not incidental or accidental, but the application of a flexible and robust telecom-type, pixel-signal processing theory and system optimization criteria.

Fortunately for the effectiveness of the present disclosure, periodically-poled materials and devices which demonstrate and are designed to perform quasi-phase matching (QPM) effects on input light perform with extreme efficiency (very low loss) and ultra-fast response times in the frequencies of convenience especially.

An typical example reflecting the state of progress in the past few years in periodically-poled materials systems and devices comprised thereof was reported by the Phd thesis work of Koustubh Danekar, August 2011, "High efficiency high power blue laser by resonant doubling in PPKTP,"

UNIVERSITY OF NORTH TEXAS, reporting a "response time typically 10-15~10-16 s."

In general, pico- and femto-second response times are reported and commercially available from devices in this category.

In addition, efficiencies continue to increase from a generally high base (example: 80%, red-green conversion Thor Labs, 2013) across the range of new periodically-poled materials systems and the commercial devices on the market and coming to market in the near future, based on new research such as that cited by Danekar.

But it must be remembered that the frequency/wavelength modulation/shifting, most often (but not exclusively) up-conversion, should not be considered as an additional power-loss burden on the system of the present disclosure. Rather, it should be considered as one element of the overall calculation of illumination system efficiency—i.e., to achieve full color in any given system with any given illumination technology, all components and processes, whether consolidated in a conventional "lamp" unit (or visible laser or LED RGB or other color system output), are added together.

An apples-to-apples comparison, to provide the proper context, would be the net efficiency of the color illumination energy budget of systems encompassed by the present disclosure, including optical power delivery to the pixel-logic encoding stage, including any frequency/wavelength modulation/shifting involved "within" the optical power generating unit to deliver the frequencies delivered, as well as any operationally separated stages which "complete" the process of input energy and output full-color/visible light energy as required for any display system and as required by the specific color performance spec for that system design.

c. Shocked-crystal frequency/wavelength modulation/shifting.

In a number of configurations and embodiments of the present disclosure and the disclosure of the parallel co-pending application, this method for realizing a frequency/wavelength modulation/shifting operation (as well as for realizing bandwidth management and peak intensity) is preferred. The reason for this preference is the efficiency and tunability of such a device for the stage for many versions of the system of the present disclosure.

It is an additional object of the present disclosure to propose a practical device implementing the shocked-crystal effect and improvements related thereto, as an improved and preferred (in some instances) device and component of the overall telecom-type and structured, pixel-signal processing system of the present disclosure.

As disclosed in an incorporated patent application, the demonstration by Reed et al of the potential of shocked crystals to generate almost "lossless" (not including the energy expended in the shock-wave itself) was referenced as one of the categories of methods encompassed within the disclosure for frequency/wavelength modulation/shifting.

Reference was specifically made to the following publication: "The Color of Shock Waves in Photonic Crystals," Evan J. Reed, Marin Soljači c, and John D. Joannopoulos, Department of Physics, Massachusetts Institute of Technology, Cambridge, Mass. 02139, (Dated: Mar. 17, 2003)

"Abstract: Unexpected and stunning new physical phenomena result when light interacts with a shockwave or shock-like dielectric modulation propagating through a photonic crystal. These new phenomena include the capture of light at the shockwave front and re-emission at a tunable pulse rate and carrier frequency across the bandgap, and bandwidth narrowing as opposed to the ubiquitous bandwidth broadening. To our knowledge, these effects do not occur in any other physical system and are all realizable under experimentally accessible conditions. Furthermore, their generality make them amenable to observation in a variety of time-dependent photonic crystal systems, which has significant technological implications.

PACS numbers: 42.70.Qs, 42.79.Nv, 42.79.Hp, 42.79.Jq, 89.20.-a"

Describing the reasons for the observed effects, including the ability to both broadly widen the band and narrow the band, as well as shift frequencies up or down:

"The light is essentially trapped in a cavity which is "squeezed" as the shock compresses the lattice, thereby increasing the frequency. This occurs once each time the shock propagates through a lattice unit."

Since 2008, Reed has continued his work, originally begun at MIT and tested at Lawrence Livermore National Laboratories, and reported success in developing a practical means for generating such shock-waves in a photonic crystal system as Reed first modeled and investigated. Reference is made here to US patent application number 20090173159 Reed; Evan J.; et al.: "Method for generation of THz frequency radiation and sensing of large amplitude material strain waves in piezoelectric materials," as well as to U.S. Pat. No. 7,788,980, of the same name, also Reed et al.

The pending application and issued patent differ only in the source of the shockwave into the piezo-electric sandwich—but the source is in neither case the piezo-electric sandwich itself. In the two disclosures, the sandwich implements conversion of the shockwave to Terrahertz radiation.

From pending application number 20090173159:

Abstract:

"A method, comprising: providing a first piezoelectric material in contact with a second piezoelectric material to form an interface, wherein said first piezoelectric material comprises a first piezoelectric coefficient and wherein said second piezoelectric material comprises a second piezoelectric coefficient, wherein said first piezoelectric coefficient is different from said second piezoelectric coefficient; and generating a shock wave in said first piezoelectric material, wherein said shock wave comprises THz frequency oscillations, wherein said THz frequency oscillations are converted to electric polarization currents at said interface, wherein THz electromagnetic radiation is generated with temporal behavior matching that of said shock wave."

It is, by contrast, the proposal of the present application to propose a bi-directional (and, in one optional version, bi- or multi-axial) piezo-electric sandwich (individual piezo layers or stack) surrounding on at least two sides appropriate photonic crystal materials, and the use of transparent piezo-electric materials for opposing piezo-electric layers disposed in the path of the signal propagation.

In addition to the novel disclosure of shocked-crystal signal modulation as a preferred method of frequency/wavelength modulation/shifting, in the nature of the observed effects of shocked crystals, it also serves as a bandwidth optimization and peak intensity-within-band management (these last as optional operative pixel signal/data signal modification functions and stages provided for within the model and plan of the present and co-pending disclosures.)

To improve the energy available to the opposing "poles" of the piezo sandwich or box (in-path and/or transverse), high-capacity graphene capacitors may be disposed to rapidly release a high charge potential across a charged piezo layer or stack.

The opposing shock-waves, including shock-waves from both in-path and transverse to the signal path, will substantially increase the maximum energy and velocity of the shockwave and the range of tenability of the device realized thereby.

Passive vs. Active/addressed

For most applications and configurations of the present and co-pending pixel-signal processing disclosures, an energized but "passive/bulk" shocked crystal device for this operative stage and function of the present system is preferred.

There may, however, be a RGB-based "tiling" version, in which for each color channel, a different material and tuning is provided by means of the materials structure and formulation (piezo and/or photonic crystal dielectrics) for the RGB (or other color system) subpixel.

However, with reference to the co-pending application, the present detailed practical and novel proposal for shockwave-based modulation may be modified in active/addressed versions.

The first of these, because of tunability of the degree of frequency/wavelength modulation/shifting per frame, allows for the potential elimination of separate RGB (or other composite) sub-pixel-type color systems.

Instead, each piezo-sandwich/box shocked crystal pixel is tuned per frame with a precise frequency/wavelength shift or a desired bandwidth.

This provides for a simplification of one aspect of typical RGB (or other component) color systems, while increasing the complexity of the frequency/wavelength modulation/shifting stage. This then is a "Best fit"/holistic design optimization matter which the flexibility of the system of the present and overall system of the co-pending disclosure enables.

A second embodiment of the active/addressed version realizes a detailed practical version of the variant display system type proposed in the co-pending application, in which pixel-logic encoding is accomplished "implicitly" by means of the use of non-visible optical illumination source in conjunction with an addressed, tunable frequency/wavelength modulation/shifting array.

Such a system is frame-rate limited by the speed of the relative shockwaves through the PC crystal. But with the improved and demonstrated ultra-fast discharge of graphene-based capacitors, combined with the unique opposing sandwich/box configuration of the piezo generation means, shockwave speeds far greater than what otherwise will have been practical and realized for micro-piezo devices in particular will reduce the relative disadvantage in pixel logic encoding/switching speed of the present variation.

Advantages of the present variation may be potentially greater simplicity of design, fabrication cost, and power usage in operation as compared to some other versions.

In all variants of the novel proposal for shocked-crystal based frequency/wavelength modulation/shifting, whether "bulk" or tiled, passive/energized or active/addressed, the absence of the insights of the present disclosure and the division-of-labor optimization of the telecom-type and structured, pixel-signal processing system, the applicability of the shocked crystal effect and devices to implement the effect would hardly be obvious. In general, the further application of an active array of shockwave-inducing piezoelectric "traps" or sandwiches of PC materials for SL-type signal processing arrays, and even more so, pixel-signal processing arrays for display applications, is not obvious, and the novel detailed practical version implementing the shocked-crystal device is more effective and compact as just disclosed.

d. Hybrid schemes, combining more than one of these or other frequency/wavelength modulation/shifting techniques, typically in series, are also proposed. This can be effective for tailoring the spectral profile, especially broadening of the "color space" of the overall display system and/or increasing the number of discrete narrow bands or peaks, when one method is more effective at a given frequency/wavelength than others.

e. As has been proposed in an incorporated patent application, the system of that disclosure, of which the present disclosure is a detailed disclosure of an improved version, with additional disclosure of improved components and system applications, also encompasses a version of the disclosed system in which, operating on non-visible input illumination, an actively-addressed array of frequency/wavelength modulating/shifting device elements effectively implement a pixel-logic encoding system in which the default encoding is 0. While actively-addressed versions of these and other frequency/wavelength modulating/shifting methods are not as efficient as the passive methods referenced in particular for the present stage of the presently disclosed variant of pixel-signal processing system, such a new display type, by allowing the elimination of one discrete stage, may provide some advantages for some display and/or array applications.

6. Optional Pixel-signal (array signal) amplification/gain

In versions of the system which is the subject of the present disclosure (and of the co-pending disclosure at a more general level) in which a low-intensity signal is advantageous for either the efficient operation of the functional signal-processing stages, or for other reasons (such as configuration of the overall system for long-distance/spatially separated versions of the processing stages), a subsequent signal amplification stage is typically necessary.

No detailed elaboration is required for specification of some of the major technologies and devices available for fulfilling this operative function in the pixel-signal processing (or SLM-type data array signal processing) system of the present disclosure, but the following methods are listed—they may be used individually or in conjunction in hybrid forms:

SOA (silicon optical amplifier)
    EDFA (erbium-doped fiber amplifier)
    OPA (Optical parametric amplifier)

Other forms, as is evident, that become available and advantageous may be implemented as well.

Configurations encompassed within the category of configurations proposed optional "stage" 8 below will imply preference for some of these techniques over others, depending on "where" (physically and in the overall pixel-signal processing sequence variant employed) the signal amplification/gain is implemented.

In Part II below, further details on this very critical stage to that configuration are provided.

7. Optional analyzer for completing physical light-valve in cases where analyzer is omitted from pixel logic encoding stage (delayed "read" stage).

8. Optional Configurations for Wireless (stages) of Pixel-Signal Frames/Sub-frames:

In a wireless addressing and powering version of the present disclosure, compatible with co-pending Wireless Addressing and Powering, the following differences are proposed:

1) De-multiplexer is preferably O-O (RF frequency/wireless): preferably a frequency/wavelength modulator/shifter system (resonant up-conversion from RF to IR/near-IR), with amplification/gain as required, with each pixel-logic encoding frame subset (or frame, if in buffer) preceded by a matching addressing frame subset, or alternatively, integrated in a quasi-frame subset of pixel-signal logic encoded by means of the addressing alone, such that any elements of a distributed array which do not receive an addressing signal are default "zero-encoded" as to pixel state.

2) Other sub-pixel or pixel data are encoded either by means of time-division multiplexing of the types already described (brightness; optionally also color, in straight-forward application to this case of methods already proposed in general and other cases; or additional pixel-state data is included in the wireless addressing data packet.

3) Each wirelessly-addressed element (or sub-sector) then is preferably a local wired or wireless O-O type, but may be an O-E-O type (wireless RF to electronic to optical near IR/visible; other variations in Optical-Electronic sequencing are also subsumed); in the case of a subsector which then addresses sub-pixels or pixels or clusters, the sector is served by sector-addressing multiplexer, also preferably O-O, following the methods and devices herein disclosed or modifications functionally similar. O (RF frequency)-E-O schemes are also possible, as well as a variant of DDMG-subtype 1 in which direct E writing to arrays only is implemented.

4) In a frame-simultaneous system, preferably an inverse-MO array (or arrays) is employed, with either a permanent memory-encoded order of buffering until the array (or arrays) is fully-written, then all elements of all array(s) are triggered to the next de-multiplexing/RF addressing stage, such that an entire distributed array is addressed simultaneously though written sequentially into an MO-type memory buffer for delayed RF de-multiplexing/distribution.

5) In a Wi-Max or Wi-Fi Wireless Cellular (or other wireless band) data distribution system, the pattern and method of adaptation is applied similarly: preferably, in an all "optical" wave propagation and processing-based system), wave-encoded information is received (generally) in the "UHF" portion of the RF frequency range and frequency/wavelength modulated/shifted, employing formatting and structuring methods following the pattern and methods disclosed variously herein. However, while all-optical is preferable for its speed and other benefits, optical-electronic conversions, both existing and new methods to be developed, may be employed and are subsumed as variants of the disclosed system herein.

II] Optional "DWDM-type" system and significantly compatible with existing DWDM architectures, substantially eliminating the need for optical-to-electronic conversion for and at the final user end for image data, accelerating the advent of all-optical networks, enabling a practical "pixel-signal processing" server farm that sends final screen frames on an "image rendering/cloud server" architecture, and which includes conversion/formatting of sequential and/or optical fiber spatially batch-allocated pixel signal subsets for quasi-direct image transmission over telecom (and local-network) distances—again, compatible with existing Internet/telecom systems with relatively minor modifications Purpose of DWDM-type implementation eliminate at least one of the three "E" conversion stages in digital network architectures, and significantly accelerate the change-over to all-optical networking It is a primary objective of the present disclosure to propose a display system that can not only implement network-type and structured pixel-signal processing and benefit from this architecture and optimized components in compact, integrated display packages and form-factors familiar to consumers and industry, but also to implement practical spatially-separated embodiments in which processing stages and steps may be conducted remotely from each other, and furthermore, a spatially-separated network-type system that may be implemented in a DWDM-type system with some modifications.

Such spatially separated systems, in simpler and different forms, were previously proposed by the inventor of the present disclosure, as well as in a new, pixel-signal aggregation/disaggregation architecture (combining, for instance, multiple pixel modulation sources into a single unified channel which then generates a final output sub-pixel and pixels), proposing methods of and benefits from decoupling the conventional 1:1 relationship between color sub-pixel source and final color sub-pixel output, and developing new methods and applications of 1) textile-composite-type fabrication processes to enable fiber-optic channel transposition and 2) bulk-optic signal aggregation, in U.S. Patent Application No. 60/544,591 filed 12 Feb. 2004 and hereby expressly incorporated by reference.

A purpose of the first disclosure originally filed in 2004 was to separate the lamp from the modulator and the modulator from the optics. This form of isolation was principally proposed to provide thermal isolation via fiber-optic connection for such display types as high-flux digital cinema projection systems, or to enable remote optical cabling for a new and improved class of fiber-guided or fiber-optic faceplate system. In addition to projection systems, a central distribution system of images through fiber bundles to multiple auditoriums was proposed, as well as HMD systems in which the image was generated and routed via fiber to an HMD viewing visor/glasses optics.

The purpose of the second disclosure was to allow for combination of multiple pixel generators, including generators from different types of technologies, both co-located on-chip or deployed in "image servers" more remotely; such multi-sourced pixel channels would allow improvements of final pixel output, such as increasing brightness, frame rate, contrast, and color gamut simply by addition of signals.

By contrast, among other benefits and features, the present disclosure focuses on the photonics and opto-electronics of signal processing, de-composing the constituent parts and elements of the pixel signal from a wave property and pixel property perspective, and after such "deconstruction," reconstructing a typically heterogeneous, multi-stage system with optimized (and in most cases, counterintuitive from the point of view of conventional display concepts and engineer), components and signal processing operations, determined by a "holistic" design optimization rule for all the components working together but also specifically taking into account "frequencies of convenience" and optimal efficiency ranges for different devices and materials systems, and the application of a method of "best fit" for each device not only as individual components but also as elements of an overall system. A distinctive feature for any display system designer is the deliberate and systematic departure from assumptions of performing pixel signal alteration on visible signals.

At a high level, the present disclosure and more generalized co-pending application contemplate but "proximate" form factors of a "pixel-signal network display in a box"—that is, compact, unitary-packaged display systems in which all operations take place within a local, compact package.

But in addition, as noted, the present disclosure and the co-pending disclosure are intended to provide for fully-specified and characterized "distant" or "remote" network embodiments, in which significant signal processing tasks take place remotely from the proximate display face which the user interfaces with.

And is the approach here, in this "stage" described below, taken to one ultimate version of such in a DWDM-type system that may be implemented on existing DWDM systems with minor modifications, as well as realizing improved DWDM-type systems with more significant modifications.

While the following proposal details are not strictly a "stage" of a specially configured version of the type of system encompassed by the present and co-pending disclosures, the design and optimization considerations are a distinct system design consideration, and indeed the configuration required for the purpose outlined may (depending on type and adaptation to vs. evolution of existing DWDM-type systems) require some additional stages/pixel signal processing operations, or significantly different sequencing of certain operations than would be the case in most other "proximate" or "compact" versions of the present system.

Essentially the following is a configuration requirement for signal processing stages to enable preparation of sets of pixels (sub-frames) to be prepared for time-staggered and/or fiber-allocated sub-division for, in effect, direct-image transport over distances that may range from local-area network to long-haul telecom distances. In certain versions, devices/processing stages which may not be needed for most or any other system types may be an option or preferred for this system.

As such, it proposes an alternative to some stages of literal DWDM or WDM systems, in which electrical signals are converted to optical signals of varying frequencies and multiplexed into-high-capacity fibers. By the configuration and application of the pixel-signal processing system of the present and co-pending application, devices of the present proposal would typically "serve" subsets of image frames to optical fiber channels.

Given that, according to Cisco in 2011, 51% of all Internet and increasingly telecom traffic consists of the transport of image information encoded as "frames" of information (or rendered "pages"), whether pre-recorded, live-rendered, or live-broadcast/captured, there is a significant opportunity to reduce the number and complexity of encoding steps, speed up the distribution of that image content to optical fiber carrier channels, and reduce the power consumption and cost of devices, not only in the image transmission networks, but in the "head-end" which is the display device itself. According to the same Cisco 2011 analysis, the percentage of traffic may be expected to increase to 90% by 2015.

Thus, it is a major objective of the present and co-pending disclosures to provide spatially-separated, efficient-division-of-labor pixel-signal processing over telecom distances and via DWDM-type networks, in order to enable significant movement towards cheaper, faster, and higher-bandwidth O-O-O networks (designed on their own terms, taking advantage of inherent differences of all-optical rather than using optical as a piece-by-piece replacement for electronic), with O-O-O defined as up to and including the device and not simply optical to the "wall"; and furthermore, to provide thereby for a network that is more resilient to such risks as solar radiation disturbance, EMF disruption, or extra-normal power grid fluctuations Configurations and Sub-Types:

The following are the configuration requirements for implementing the special case telecom-distance "remote," DWDM-type system of the present disclosure, organized by sub-types of the proposed system.

The sub-types of the present DWDM-type variant on the general system are broadly distinguished by the degree of movement towards all-optical networks, also known as "O-O-O." Here we propose an expansion of the naming system, to four places: e.g., "O-O-O-O" (or four-O) defined as "O-O-O-to-and-within-the-device" (i.e., one or two steps beyond "fiber-to-the-desk" aka FTTD, because both electronic de-multiplexer and electronic video processor have been replaced with an essentially all-optical component/process).

Since these designations may not have been fully standardized or understood in a way that best serves the explanation of the disclosed system, for simplicity sake here we assume that at the base of the network and start of the data and signal processing sequence is currently some sort of semiconductor-device-centered electronic signal processing, that through a multiplexer, launches optical signal into an optical network, which then typically requires a O-to-E de-multiplexer at the end of the process, which then sends an electronic signal and data/information to semiconductor-device-centered and from there to related electronic display array-centered display output.

So, in the following variant of a commonly used designation system, the "E" at the base is assumed. Here the question and focus is the complete or partial elimination of the "E" at the end of the sequence, In order of movement towards all-optical; focusing here on the stages going from the fiber to the display, but actually encompassing the multiplexing stage that launches optical signal into the optical network. The key stages we can either adapt our system or evolve/replace that stage with a different type of device are the multiplexer stage, the de-multiplexer stage, and the display processor stages. (N.B., that not all sub-stages or devices of modern networks are specifically treated here, and in those cases, the methods and devices of the disclosure will have application following the pattern of the disclosure; and furthermore, it will be evident from the foregoing the application of the present disclosure to ROADM and other technology building blocks/functions of modern systems.)

1. E-O-E-B/E: electronic-to optical multiplexer-optical fiber-optical-to-electronic de-multiplexer-"bypass" electronic video processing of image file data to drive electronically-driven optical output of screen 2. E-O-O/E-O/E: electronic-to-optical multiplexer (evolved version according to the present disclosure)-optical fiber-partial optical/partial electronic de-multiplexer-partial optical/partial electronic handling of image components/data 3. E-O-O-O: electronic-to-optical multiplexer (evolved version according to the present disclosure)-optical fiber-all-optical de-multiplexer-all-optical device-stage final assembly and presentation of image display Taking now these broad cases in order:

1. E-O-E-B/E: here are required the fewest changes to a more typical DWDM-type system.

This version is essentially a corollary/consequence of the essential version of the system, but one which dispenses with ANY optical throughput from the network to the screen.

What remains, however, from the unique system after stripping out the backbone benefit/feature (optical image information) is the feature of one version of E-O-O/E-O/E termed "direct image writing to screen by network" (DI-WSN) or "direct image writing to screen by cloud" (DI-WSC).

This bare-bones system variant, bypasses, for at least a portion of the users device screen, the local device processor(s) (such as a video processor and/or microprocessor) and instead the network drives the screen electronics remotely. In other words, for at least some portions of the local screen, the local device processor is over-ridden by the remote network or cloud.

The benefit of this scheme is the elimination of repetitive local data processing and simplification of the data image files themselves. By comparison to the variations of the present disclosure in which optical signal is delivered directly to a local screen, this sub-type provides substantially fewer advantages and benefits.

However, the impact on bandwidth usage in networks and processor utilization locally makes even this simplest of versions a potential major extension of the efficient division of labor inherent in the cloud computer/local paradigm that continues to develop in a multitude of respects.

Required for the implementation of this version is the addition, for any given device with an addressable display screen, one of two procedures/schemes for controlling pixels remotely:

a. Giving each sub-pixel literally a local IP-address extension, described by a two-number row-column designator, for 2D display systems, and a three number row-column-depth designator (for 3D systems which include a depth parameter).

b. A default batch write procedure, with some variant of the following write instruction:

i. a starting coordinate (x-y, or x-y-z) in a screen array (or 0,0 if the remote write operation is for the whole screen, which vastly simplifies the operation—what is then needed is a device spec, which may already be held as data remotely or which may be queried prior to the write operation)

ii. a row length (RL), which is an instruction to send pixel addressing in sequence RL number of times in a default direction (e.g., right).

iii. For a rectangular image portion of a remote screen, a column height (CH) is all that is needed, following the analogous procedure.

iv. For irregular shapes, most efficient will be a set of directions for a series of rectangles, each with its own starting coordinate.

Similar schemes for directly addressing whole screen or portions of screens, etc., either defined geometrically by reference to custom or default coordinates, or by other similar systematic means, require additional data tags added to the pixel parameter data itself.

But compared to the complexity of additional computation, data file sizes, and signal processing, as well as repetition of at least some of these, the savings in speed/storage/processing capacity/heat may be expected to be considerable.

This "base-case" version of the DWDM-type proposal may be considered to be a potentially substantial extension of the demonstrated benefits of the cloud computing paradigm.

Display device circuitry (bypass circuitry, etc.) as well as programming for and potentially some hardware upgrades would be required to implement these changes.

2. E-O-O/E-O/E: pixel-logic encoding of optical pixel channels direct to display+electronic signal control of successive pixel signal processing operations The following describes one sub-type version of the proposed Type 2 (as described above, although other sub-types according to this teaching are subsumed:

Basic pixel-signal logic encoded frames or frame portions combined with O/E delivery of additional pixel parameters to be performed locally.

i. Frames or frame portions generated remotely by a multiplexer of a type following the present disclosure (or other types implementing the same functional outcome), ii. conveyed as a sequential (sub-pixel by sub-pixel or pixel by pixel) or at least partly simultaneous frame/wave subset of pixels/sub-pixels over the fiber network, iii. De-multiplexer: partial O-E, partial O-O.

1. part of the optically encoded information (the pixel signal logic encoding, sequential or simultaneous spatially-preserved wave-front) is routed (with routing data optically encoded/decoded) directly to the device IP address—that is, actual pixel signal, delivered for further processing.

2. additional pixel parameters (such as intensity values, to be sent to the signal amplification/gain stage/operation for addressing the gain device for that sub-pixel/pixel channel) are decoded by the de-multiplexer and are routed to the local device as an electronic signal that provides instructions, per sub-pixel/pixel, to each operative part of the local display device.

To ensure synchronization of direct-optical-pixel writing (DOPW) with the additional pixel data, it is practical to transmit the additional data in advance, where it may be held in a local buffer (locally at the de-multiplexer stage, which may be a central building or neighborhood switching station, or proximately, at the final device stage) and released on the arrival of the live pixels.

Electronic data direct-addressing of final pixel-signal processing operations in the user display system preferably follows the proposals of Type 1 above.

3. E-O-O-O: pixel-logic encoding of optical pixel channels direct to display+self-encoding for intensity/amplification+supplementary optical signal delivery direct to display for optional successive pixel-signal operations This is the preferred sub-type and embodiment of the DWDM-type version of the system of the present disclosure, because it proposes a radical conversion of many current telecom network operations from electronic to optical, adding speed and bandwidth and removing data-choke points, while simplifying computational requirements and duplication and data file sizes to an even greater degree than sub-type 1 or 2.

As with Sub-type 2, pixel signals are conveyed as a sequential (sub-pixel by sub-pixel or pixel by pixel) or at least partly simultaneous frame/wave subset of pixels/sub-pixels over the fiber network.

If a frame or frame subset, what is transmitted is a pixelated wave-front of spatially-preserved relative orientation of its pixelated elements, either transmitted in a single high-capacity fiber (eventually, as fiber capacities increase, and potentially sooner given the additional capacity utilization is obtained from packing strategies such as those proposed herein and many others in development in the field) or more practically at present, multiple fibers in a bundle.

As an all-optical version of the proposed DWDM-type system, not only is the pixel-signal logic encoded optically, and color (see the following specification/corroboration of color signal handling), but intensity is self-encoded (by either of at least two methods), and set-stating frames or frame-subsets of distinct frequencies (to provide optical signal delivery of optional successive signal-processing operations (see primary description of de-composed pixel-signal processing system above), transmitted in "safe" frequencies and/or channels that do not interfere with the pixel signals/channels.

The following proposals address:
1. The specifics of all-optical intensity information self-encoding;
2. Other pixel-processing stages activated optically with matching sets of "information frames/sub-frames";
3. Color system provisions;
4. Further details on simultaneous vs. sequential pixel transmission & Ensuring non-interference of signals in any given fiber;
5. Frame subset routing
6. Identification of frame orientation at destination
7. Optics of display output at the device-end.
1. Intensity "self-encoding"

The method of "self-encoding" the intensity level of a given sub-pixel/pixel depends on the choice of frequency/wavelength modulation/shifting chosen.

For a phosphor-based system, phosphor material compositions can be tailored in response time and gain-over-time characteristics, such that, within the duration of a given frame, if a pixel signal transmitted through the system is kept constantly "on" during a critical portion of the frame duration, the phosphor reaches peak brightness with sufficient time remaining left in the frame to decay and relax to zero.

Alternatively, a series of successive pulses, in a time-division multiplexing intensity modulation system, can achieve the same objective. For the present DWDM version, these pulses take the form of sub-frames that repeat an injection of optical energy into the phosphor over a sufficient portion of the typical duty cycle of the frame to set the level for the majority of the cycle, or sufficient to establish that level to an observer human visual system.

Given the present system's strength in bringing-to-bear the highest-speed photonics/opto-electronics modulation technology available, such as the proposed methods of the present and co-pending disclosure as well as any future best-in-breed methods, by implementing them for operation at frequencies for which they are most efficient (or more efficient than otherwise), these extremely high-speed optical data delivery operations, such as the ultra-fast discrete repetition of frames or frame-subsets to implement per-frame intensity or brightness modulation, are made possible and system design options otherwise out of reach are enabled.

Another time-division method is also proposed, which in addition supports certain versions of improved MO-related devices, further disclosed in section III (below).

In this time-division intensity level encoding method, again either discrete short pulses or relatively continuous (as in the case of phosphors) pulse is employed, but in this case the intensity-setting function is performed by an inverse MO-effect-based device.

Inverse Faraday, Cotton-Mouton, and Kerr effects have been demonstrated since 2005: "Ultrafast non-thermal control of magnetization by instantaneous photomagnetic pulses," A. V. Kimel1, A. Kirilyuk1, P. A. Usachev2, R. V. Pisarev2, A. M. Balbashov 3 & Th. Rasing1 Vol 435|2 Jun. 2005|doi:10.1038/nature03564; "Microscopic theory of the inverse Faraday effect," Riccardo Hertel, Institute of Solid State Research (IFF), Research Center Julich, D-52425 Jelich, Germany; "Inverse Transverse Magneto-Optical Kerr Effect," V. I. Belotelov1,2, A. K. Zvezdin1, 1 A. M. Prokhorov General Physics Institute RAS, 38 Vavilov st., Moscow, 119991 Russia, 2M. V. Lomonosov Moscow State Univ., Moscow, 119991, Russia; "Observation of the Inverse Cotton-Mouton Effect", 0 A. Ben-Amar Barangal,#, R. Battestil, M. Fouch e 1,2,3, C. Rizzo1,2,3,* and G. L. J. A. Rikken1. (1 Laboratoire National des Champs Magń etiques Intenses (UPR 3228, CNRS-INSA-UJF-UPS), F-31400 Toulouse Cedex, France; Universit́ e de Toulouse, UPS, Laboratoire Collisions Aǵr egats Ŕ eactivit́ e, IRSAMC, F-31062 Toulouse, France; 3 CNRS, UMR 5589, F-31062 Toulouse, France # Permanent address: NRCN, P.O. Box 9001, Beer-Sheva 84190, Israel.

Significant work on these inverse M-O effects has been a relatively recent matter; such effects were not typically predicted as an implication of Maxwell's equations. As noted by Hertel, "The inverse Faraday effect (IFE) has first been predicted by Pitaevskii more than 40 years ago." Van der Ziel et al first observed the IFE experimentally in 1965. The theory of the operation of the IFE and the related family of effects is still being developed, with various proposals in addition to those cited (e.g., G. Barbalinardo, "Quantum Theory of the Inverse Faraday Effect for Ultrafast Magneto-optics," Uppsala University, 2011).

The preceding references are further cited elsewhere in the present disclosure.

In the novel proposal with respect to this function in the present disclosure, which is effected in slightly different configurations according to the differences in the three inverse-MO effects listed, pixel-signals (in sequence or in a simultaneous "volley", forming a pixelated wave-front) on exit from the fiber-optic network are intercepted at the local station or at the proximate device head-end by a mediating inverse-MO passive (either continuous MO film or array of film-lets of MO-doped fiber) array. etc., onto which the pixel-logic state is written, followed in effect (self-coding) by the intensity setting, either by a relatively continuous pulse at the head of a frame duty-cycle or a series of short pulses in a portion of the frame, such that the input of optical energy builds up the magnitude of magnetization state with suitable choice of MO materials composition and/or periodic structuring (see below reference to latching gratings/PC structures). A much higher-intensity "read" illumination source that is local or proximate then illuminates the array, and the magnitude of latched B field then provides a step-incremental (quantized, base—"X") rotation of the polarization vector of the high-intensity "read" illumination.

This proximate/local, still telecom-frequency illumination (array of pixels, composed of sub-pixel groups) then passes through the appropriate frequency/wavelength modulation/shifting stage and operation (phosphors, periodically-posed QPM-type materials, shocked crystals, etc.), and subsequently through any optional successive pixel-signal modification stages.

2. All-optical-based activation of any successive (optional) pixel-signal processing stage may be implemented by means of sets of pixel-logic encoding frames or sub-frames, of a given frequency range, and successive and matching sets of signal (spatially correlated, sequential or simultaneous) that follow and/or accompany the pixel array, which are either assigned "side-car" optical channels alongside the pixel channels until both reach the stage (array of pixel-signal altering means, such as inverse MO or EO-mediated state-setting devices in array, adjacent to pixel channels) where energy of the optical signal is converted to a signal-influencing system to perform a pixel-signal operation on the pixel-channel itself.

Alternatively, this activating signal designed to energize an operation that modifies the sub-pixel channel may be a non-visible signal of shorter wavelength than visible wavelengths, or a non-visible IR or even visible frequency that is "reserved" and later band-gapped by a PC filter (and/or energy recovery stage) following the operative phase. This non-visible high-frequency (or lower reserved frequency, typically very narrow band) is chosen for more efficient activation of the pixel-signal modification function proximate to the sub-pixel/pixel channel.

If it is present (logic state 1 or non-zero, depending on the system) then the function is activated through the mediating energy-exchange system; if not, no activation occurs. If present but still some unused portion of the signal passes through, the filter/recovery stage following will remove/recapture any unused radiation.

If there is delayed response to the effect in question, then this functional signal is launched prior to the pixel-signal itself.

This method may also be implemented for additional signal amplification gain, in a system in which a gain medium is pumped by a relatively continuous pulse within the frame duty cycle, or a series of pulses. This is a supplementary system to the intensity setting and processing methods already described.

3. Color System Considerations: it is evident from the foregoing that for each sub-pixel, a pixel-logic encoding operation is performed at that stage; the performance or non-performance of sub-pixels (of any given color system) thus determines the color composition of the final pixel.

It is important to note that to ensure non-interference of signals, either in fast succession or simultaneous, that these otherwise functionally identical sets of "red" or "blue" or "green" pixel-logic encoded channels are transmitted in offset frequencies within the non-visible band(s).

However, via the intensity modification means (primary and amplification/gain), further modification of the color-space of the local sub-pixel group and of the overall image and display system can be implemented.

Whether sent sequentially or simultaneously, sub-pixels in the proposed system (certainly the preferred version) always assign a constant geometric arrangement of sub-pixel (and therefore, color channels), the relatively spatial orientation of which is preserved in the integral or staggered wave-front in each fiber.

This means that it is inherent in this arrangement for a spatially-organized color system starting from the original multiplexor through the entire pixel-signal generation and distribution process.

For certain system designs, it may be convenient to interleave R, G, and B (or other channels of other color systems) sequentially; so that a sequential transmission of spatially-separate R pixels is followed by the same for G and then B.

In addition, certain bands may be reserved with the preferred telecom frequency/non-visible system range for the synthetic R, synthetic G, synthetic B bands, so that an additional constant coding regime implemented thereby, and successive pixels-signal processing stages and devices may include pass-band filtering of a type that only allows the particular non-visible band of interest, in case of mixing errors, etc.

4. Considerations Relative to ultra-fast sequencing of sub-pixels in frames or frame subsets vs. "simultaneous" transmission: the tradeoff is between speed and fiber capacity to support non-interfering channels. There is a further significance in image-type and quality of same with respect to the human visual system's response to scanned images (i.e., television) and celluloid film-like "full frame" images.

A simultaneous system will be typically implemented at the multiplexing stage, through an additional bulk "shutter" system: in such a system, a multiplexor (according to the present and co-pending applications) is typically sequentially addressed until the entire frame (or subpart) has reached its pixel-logic encoding state, but the multiplexor output is "blocked" from coupling signal into the fiber(s) by a second "bulk" shutter, such as an MO-effect-based shutter, timed to open and close with the "priming cycle" of the multiplexor.

5. Frame Subset Routing: as described essentially in Type 1 above, frame subsets are divided sequentially or simultaneously between fiber-optic channels.

If simultaneous, then it is expected that multiple multiplexors may most often be used, working in tandem, dividing up frames between them and inserting them (through best-available coupling optics) into their respective optical fibers.

If sequential, multiplexors may (as is practical for certain devices), divert batches/sets of pixels between different fiber(s); preferably those that will be used will be based on devices proposed in the present and co-pending disclosures because of the extremely high speeds compared to other technologies.

Pilot signals as part of these subsets provides optical signal data for the routing by the de-multiplexor(s) at the receiving end.

Provided lookup information about the final device IP type, then a fixed sorting procedure can also be activated without any further routing tag/pilot signal.

6. Detection of Frame Orientation at Destination & Preservation of spatially-preserved frames (pixels in final spatial orientation) or frame subsets:

In long-distance transmission of a wave-front, wave-fronts may be commonly expected to arbitrarily rotate around the optical axis, with an unpredictable orientation on exit.

To ensure proper identification of orientation, pilot pixels of different assigned frequencies (typically lower or higher than the transmission range for normal pixels) are positioned at vertices. The de-multiplexer reads these positions and performs a transposition of the pixel frame subset accordingly, by the O-O method.

7. Optics of image delivery at the display head-end: pixel/image expansion

One or more of the incorporated patent applications, to some degree, disclose methods of pixel-scaling and image-scaling which may be employed as physical solutions for the physical build of systems of the present and directly-related, more general co-pending disclosure.

In addition, we propose here three novel solutions of particular relevance to the needs of the present disclosure:

a. Individual Fibers, possessing sequential or simultaneous frame (and display array) subsets, are routed in a 2D textile composite planar deployment (fibers lying roughly parallel along either one axis in a "sheaf" or in two axes (two sheaves at right angles or interwoven 2D matrix).

The terminus of each fiber, delivering not individual pixel information but multi-pixel information, couples into a raised 45 degree reflector or prism, combined with bulk relay optics, to project an expanding image to a surface grating array (or sequence of grating) which, in the method of Lumus Corporation or BAE's holographic element systems (HOE's), capture and spread out, in a sequence of successive expansion, an image portion or "tile" that contains the frame subset.

The HOE sequence in this case is preferably multi-layer, such that instead of the sequence of interference gratings being on the same surface, they are layered, such that instead of the final grating out-coupling an expanded/dispersed image out of the plane, each grating does so and couples into the grating of the next layer, which further expands the image, and then passes the image onto the next layer and larger grating. Until the last grating in the sequence is reached, and it couples the pixelated expanded image into the next set (if any) of pixel-signal processing stages (at a minimum, this is typically the frequency/wavelength modulation/shifting stage). The last grating preferably couples into a channelized array (fiber or etched capillary holes—see co-pending application, MULTI-TIERED PHOTONIC STRUCTURES, filed on the same date as the present application and having Ser. No. 62/308,687, which is hereby expressly incorporated by reference thereto.

The total structure is one of tiled HOE's or other surface-coupling gratings structures as may be proposed and developed, paired with one or more delivery fibers which deliver a frame subset to be expanded by the sequence/sandwich of HOE's, etc.

b. Another novel method collects the fibers together in a bundle or array (with spacer elements, etc.), and couples the bundle to a bulk optics relay and expansion system, such as the T-Rhomboid prism system of Agilent Technologies.

Having efficiently re-integrated the pixelated frame with all frame sub-sets, it is then routed by means of the prism system and expanded to the point where either i. the image may be projected (a la efficient TIR prism system, see incorporated Intelligent Structural System '461 application) almost laterally onto a display screen, from thence to any following pixel-processing stages (although, optionally, such stages may be interposed in the bulk prism routing system by bonding devices directly to the prism faces and in-between prism components, where appropriate for pixel-signal routing via bulk optics.

ii. or, coupled to the expanded image, a larger structured array of optical fibers, with either a 1:1 relationship between pixel and fiber, or in any event a much lower relationship in the case of short distances and/or employing the option of a correspondence mapping procedure as proposed in incorporated '461 application) to deal with transposition of pixel relationships in fiber transport, so that one of the textile-composite or other related methods disclosed in one or more incorporated patent applications and may be employed to deploy fibers in a potentially greatly expanded display surface.

c. A final novel method is a variation on 2D woven displays proposed in co-pending application 3D fabrication and materials system and devices therefrom the incorporated multi-tiered photonic structures applications.

In the variant system, and using similar methods as proposed for b. above as well as elsewhere in previously referenced applications, 3D device-structured optical fiber carrying a "write" signal for pixels in a row addresses pixels in each column of the row in question by means of a dual switch structured in the fiber at each pixel—one, a MO-related switch that routes the signal through a transverse switch structure in the fiber or in an adjacent fiber, to a second device based on an inverse-MO-type effect, setting a domain state (successive signals or a longer duration signal can increase the magnitude, as an option in some version).

Meanwhile, brighter illumination from a proximate source, coupled from a backlight or from a crossed or parallel fiber, couples into the composite device of the fiber-device(s), in which a magnetic field has been set by an inverse-MO "write" operation; and so then second operation and device in the composite structure then "reads" the state and effects a "forward" MO-related alteration (e.g. rotation of angle of polarization) of the bright signal to pass out of the transverse-structured fiber and into the next stage of the display (the frequency/wavelength modulation/shifting stage), such as a phosphor, which may in fact be another fiber-device in the 2D fiber composite. Successive cross fibers (x-y), all structured to couple transversely at junctions as well as along the normal optical axis, are bound in an filtrated binding material, itself composed of an index-contrast material (including optional nano-crystals) to ensure the efficiency of fiber-device-to-fiber-device coupling.

It is a major objective and benefit of the proposed overall system, as well as the specific configuration and embodiment of the DWDM-type, to provide network and device improvement to support the expected capacity and bandwidth demands of hi-definition live transmissions of images, on-demand transmission of video files, and beyond to "super-hi-def" images captured and broadcast at 4 k resolution, 3D/4 k, and beyond to 8 k and 8 k/3D.

8K live transmission, over the air and over terrestrial telecom backbone, has been demonstrated in real-time large-scale trials such as the 2012 London Summer Olympics broadcast, co-sponsored and implemented by NHK and the BBC.

Given the increased importance of services such as desktop and high-end telepresence and videoconferencing, such as GoToMeetingHD or high-end services from HP and Cisco, and mobile video-phone services such as Apple's Facetime, as well as movement in less than ten years and in as little as 5 of live 8 k-resolution sporting event broadcast, the need for more efficient handling of real-time and on-demand video image and file transmissions will only increase.

In recognition of the increasing importance of real-time video transmission demands, in addition to on-demand transmission of electronically-encoded video files, an extension of the DWDM-type system just disclosed is further proposed:

All-optical O-O-O-O Capture and transmission of real-time images:

Modifying the previous system disclosure to eliminate the extra step of electronic mediation of the image capture transmission and display sequence, instead of a CCD-type or other photo-electric conversion sensor means and electronic processing and transmission ultimately through signal routing and ultimately multiplexing means and then re-conversion to optical over fiber-optic networks:

1. All-optical capture one of two sequences of capture (and optional recording) and then distribution to the multiplexor stage launching signal into the fiber-optic network are employed:

a. Optical lens capture followed coupling to fiber array for pixelated transmission;

i. Followed by transmission through an optional (though likely, but not required) relatively distant frequency/wavelength modulation/shifting stage (down-conversion) of this additional pixel-signal processing stage.

ii. In turn followed by likely and preferred but not required signal splitting (to aid in multi-point distribution), including for recording purposes;

Optional recording: may be accomplished either by a. direct-magnetic writing by means of an inverse-MO effect-based magnetic medium either as the permanent medium itself (removable from a recording platform) or as a magnetic mediation layer to exchange-couple to an adjacent permanent removable medium, in which case the inverse-MO effect medium is a fixed component of the recording platform b. other conventional and emerging O-E recording technologies, optionally mediated by CCD or other photon-electronic conversion methods.

iii. In turn followed by a likely spatial profile reduction (de-magnification) and consolidation of pixelated wavefront (and subsets of original frames) into fewer and fewer optical fibers;

iv. In turn followed by a likely and preferred but not required signal amplification/gain stage;

v. In turn delivery to (typically, multiple if not many multiple optical multiplexors, following preferably the types of the present and co-pending disclosures) for distribution into the fiber-optic network;

b. Optical lens capture and "imaging" by a local sensor (vs. optional remote processing stage, as provided in a) above) which is a device based on one (hybrid of more than one) inverse-MO-effect based sensor array device (inverse-Faraday, inverse-MO Kerr, inverse Cotton-Mouton, etc. as may be further demonstrated), according to the provisions of the present and/or co-pending disclosures.

i. In this version, a read illumination source (also matching-pixelated array) "reads" the inverse-MO array directly, optionally from the reverse side and at a non-interfering non-visible wavelength of sufficient intensity as to make less likely a requirement of immediate signal amplification. This may occur in a camera unit or capture device or relatively nearby and local in a separate unit, connected by fiber-optics.

ii. The pixelated read array of pixel-signals then passes through at a general level a similar sequence of operations as is followed in the sequence proposed from ii) on above.

By this addition to the base DWDM-type system proposed, live-capture and transmission which further reduces bandwidth requirements of data-intensive electronic instruction encoding for regeneration of images later is accomplished, while still permitting recording to various memory devices and media, including via optical-magnetic exchange media or optical disc-type media, which may be implemented with MO materials, or digital holographic disc media, such as the system developed by Optware, Inc. and Inoue et al.

Optional Configurations for Wireless (stages) of Pixel-Signal Frames/Subframes—repetition of proposal provided for the general case of a telecom-type and structured, pixel-signal processing system is repeated for convenience as follows in the case of the DWDM-type variant and configuration.

In a wireless addressing and powering version of the present disclosure, compatible with co-pending Wireless Addressing and Powering, the following differences are proposed:

1) De-multiplexer is preferably O-O(RF frequency/wireless): preferably a frequency/wavelength modulator/shifter system (resonant up-conversion from RF to IR/near-IR), with amplification/gain as required, with each pixel-logic encoding frame subset (or frame, if in buffer) preceded by a matching addressing frame subset, or alternatively, integrated in a quasi-frame subset of pixel-signal logic encoded by means of the addressing alone, such that any elements of a distributed array which do not receive an addressing signal are default "zero-encoded" as to pixel state.

2) Other sub-pixel or pixel data are encoded either by means of time-division multiplexing of the types already described (brightness; optionally also color, in straight-forward application to this case of methods already proposed in general and other cases; or additional pixel-state data is included in the wireless addressing data packet.

3) Each wirelessly-addressed element (or sub-sector) then is preferably a local wired or wireless O-O type, but may be an O-E-O type (wireless RF to electronic to optical near IR/visible; other variations in Optical-Electronic sequencing are also subsumed); in the case of a subsector which then addresses sub-pixels or pixels or clusters, the sector is served by sector-addressing multiplexer, also preferably O-O, following the methods and devices herein disclosed or modifications functionally similar. O(RF frequency)-E-O schemes are also possible, as well as a variant of DDMG-subtype 1 in which direct E writing to arrays only is implemented.

4) In a frame-simultaneous system, preferably an inverse-MO array (or arrays) is employed, with either a permanent memory-encoded order of buffering until the array (or arrays) is fully-written, then all elements of all array(s) are triggered to the next de-multiplexing/RF addressing stage, such that an entire distributed array is addressed simultaneously though written sequentially into an MO-type memory buffer for delayed RF de-multiplexing/distribution.

5) In a Wi-Max or Wi-Fi Wireless Cellular (or other wireless band) data distribution system, the pattern and method of adaptation is applied similarly: preferably, in an all "optical" wave propagation and processing-based system), wave-encoded information is received (generally) in the "UHF" portion of the RF frequency range and frequency/wavelength modulated/shifted, employing formatting and structuring methods following the pattern and methods disclosed variously herein. However, while all-optical is preferable for its speed and other benefits, optical-electronic conversions, both existing and new methods to be developed, may be employed and are subsumed as variants of the disclosed system herein.

III] Improved pixel-logic encoder devices, especially hybrid MO/MPC:

Avenues for improvement of MO-type devices for display applications (and other non-display array devices and applications therefrom), taking into account the advances summarized as part of the background of the present disclosure, are still fertile.

The focus is on the MO-related devices performing the key pixel-logic (or state) encoding operation in systems of the present disclosure, although it will be evident that other devices whose performance is optimal in non-visible frequencies, such as interferometric devices such as MZ and Michelson interferometer-based devices, may perform this operation instead of MO-based or related devices. This point is also made in the more generalized co-pending application.

Improved materials are an integral part of that opportunity for further improvement, and research funded by teams and companies founded and led by the author of the present disclosure have advanced MO materials and MPC materials/passive device structures in the past ten years, and not only for display applications.

In addition to the proposals of co-pending applications already referenced, we will propose below the avenue of "hybrid" pixel device development that in particular is leveraged by and advances the performance of the telecom-type and structured, pixel-signal processing system of the present and co-pending disclosures.

However, it is important to recognize that while these proposals are being made of new types of hybrid devices in which polarization mode and state play a critical operational part of some encoding process, either pixel state encoding or data state encoding in an array or VLSI context, that does not mean that more basic (but substantially improved over prior devices) MO-related array/VLSI device designs are not sufficient to achieve the improvements of the present system-level proposal (telecom-type and structured, pixel-signal processing system).

For instances, a more basic or "simple" MO-type array device can be fabricated as follows:

1. Film and Substrate: a simple single film on either a SOG-type substrate and materials/processing system (on quartz glass or GGG), or fabricated on a silicon substrate in a silicon-heterogeneous system (see work published by Sung et al below), Preferably using either a high-quality LPE film or a high-quality MO film fabricated by the commercially available low-temperature RF-magnetron sputtering variant by Plasmaquest Ltd., called high target utilization sputtering (HiTUS), which has been employed to fabricate high-quality MO films on silicon substrates, following a program initiated by the author of the present disclosure, and in accordance with the work reported by the group who originally pioneered MO-films on silicon:

Magneto-optical garnet waveguides on semiconductor platforms: Magnetics, mechanics, and photonics Sang-Yeob Sung, Anirudh Sharma, Andrew Block, Katherine Keuhn, and Bethanie J. H. Stadlera) JOURNAL OF APPLIED PHYSICS 109, 07B738 (2011)

2. Bi-Stable/low power: To provide for bi-stable and in general "latch-able" devices, an annealing operation, as commercially employed by Integrated Photonics to fabricate their MGL single-domain latching MO film product, or as has been previously developed and demonstrated by teams under the direction of the author of the present disclosure, may be performed in a simplified form (as compared to composite-latch-able or "exchange-coupled" structures, as first proposed by the author of the present disclosure and later developed by the team assembled under his direction* or latching implemented by special gratings structures fabricated on the surface of an MO film (*Panorama pending application. *Garnet multilayer thin film structure with magnetostatically-altered and improved magnetic properties prepared by RF magnetron sputtering High Capacity Optical Networks and Enabling Technologies (HONET), 2011 Date of Conference: 19-21 Dec. 2011, Author(s): Nur-E-Alam, Mohammad Electron Sci. Res. Inst., Edith Cowan Univ., Joondalup, W A, Australia Vasiliev, Mikhail; Kotov, Viatcheslav Alekseevich; Alameh, Kamale E.

3. Device Type—Transmissive or Reflective: For a planar substrated device (such as computer chips or LCD's fabricated on glass), an MO-based array may be transmissive (light passing through the back-plane) or reflective, or quasi-transmissive or transflective, as proposed in the incorporated multi-tiered structure application. For the sake of the following exemplary "basic" device, transmissive type is specified. In the case of silicon, capillary holes provide for the transmission of light through the backplane silicon substrate into the active device layers.

4. Optical and magnetic isolation: To provide for optical path control and prevent optical cross-talk, while also providing for magnetic domain isolation and prevent magnetic cross-talk, a deep-etch operation may be performed around each addressable sub-pixel. Instead of leaving an air gap, a deposition pass is made to fill the gap with an impermeable material that also has sufficient index contrast to couple the light efficiently to the sub-pixel area.

Alternatively, with slightly greater complexity, one or more additional etching procedures, optionally combined with additional depositions, may be undertaken to fabricate a periodic structure in the optical coupling/magnetically impermeable material. This operation may fabricate capillary holes in a material which is not otherwise impermeable, or not otherwise (in bulk) of appropriate index contrast or either; and those holes may or may not be subsequently filled by a subsequent deposition of materials.

The aim would be to model a periodic structure in an isolation material which performs both optical coupling and magnetic domain containment. Such periodic structures can also be realized by fabricating different periodic structures in layers, such that an inner layer is patterned periodically (in a 1D pc) that effects magnetic containment and an outer layer effects a PC-type synthetic index change. Two differently optimized 1D periodic "holey" structures thus surround an active subpixel core in the form of nested (for instance, square) tubes, one inside the other.

Fabrication complexity is simplified by a single mask set with the two calculated PC structures etched at the same time. Depending on the basic MO film, it may also be possible to avoid any deep etching and simply etch the nested "tubes" surrounding the sub-pixel core directly in the active material.

5. Efficient field-generating structures for imposed B field: a conductive material is disposed substantially in the pathways of the sub-pixel core (preferably, as in earlier disclosures by the author of the present disclosure, a top and bottom coil; more complicated variations include multilayer coliforms connected through vias), fabricated in one or two ways (and others of similar functional result):

a. A transparent electrode material such ITO, but specifically transparent to telecom frequencies for the preferred version in which the pixel-logic encoding is performed in a non-visible frequency.

b. A periodic array/grating or surface-plasmon-patterned film which is effectively "passable" or transparent to the frequencies in question by virtue of the calculated periodicity for the materials in question. By fabricating a densely packed (rectilinear switchback, circular spiral, or other geometric configuration) planar coil-form of appropriate spacing and periodicity, and which may be fabricated of materials which may be opaque in bulk and metallic or graphene in composition. (See co-pending application 3D fab, materials system, and devices made thereby).

It is expected to be a simplifying design choice for the non-periodic segments of the coliform where the track changes directions outside the optical path but not too far into the fill between subpixels—such as, in a rectilinear switch-back pattern, where the conductive tracks deviate from the principle grating form and axis of the coliform.

6. Addressing and interconnect: there are trade-offs between using SOG-type platform, including addressing and interconnect materials systems; but in any case, transparent ITO-type materials will typically be used for active matrix addressing logic.

However, interconnect is more advantageously implemented by graphene, which (in a top-bottom field generating scheme, is fabricated through the demonstrated method of El-Kady and Kaner of commercial DVD-burner-quality semiconductor laser of graphene formed from a solution of graphite in water. Scalable fabrication of high-power graphene micro-supercapacitors for flexible and on-chip energy storage, Maher F. El-Kady, Richard B. Kaner, Nature Communications 4, 1475 (March 2013)

7. Optional analyzer integrally fabricated on device: in the system of the present disclosure, it is not preferred (but not a detraction) for an analyzer (in MO-related devices where polarization rotation is the pixel-logic/stage encoding stage, whether from Faraday-type, or MOKE, or MC, etc.) to be integrally fabricated on the operative device in order to complete the operation of a physical light valve. But commercially, gratings-structures have been fabricated on Faraday rotators and isolators for some years (for example commercially available from Integrated Photonics working with NanoOpto in the mid-2000's)

It should be emphasized that this "basic" design is only one example of a relatively simple, compared to what can be achieved now, design subsumed under an echelon of relatively simple designs based on a single MO-type effect and basic modulation/encoding method—which is, however, still a major advancement in every critical respect over earlier single-effect MO-based array designs for display (or non-display data array) and, in general, MO-VSLI designs of the past.

It should also be noted that simple multi-layer films may be employed rather than single films, to realize potential advantages from 1D MPC structures, in which typical active layers are lambda/4 thickness, and which may alternate active MO films/layers with other dielectric layers.

In addition, another parallel type of "simple" single-MO effect device are ones based on planar MO-devices, typically implemented as 1D or 2D surface gratings (1D)/hatched gratings (2D).

Both of these categories have been fabricated and demonstrated in programs under the direction of the author of the present disclosure, confirming the benefits of these approaches for differing applications.

But, as noted, none of these "single-effect" device subtypes exhaust the possibilities of improved MO-based and related devices, and indeed such improved hybrid devices have been developed and demonstrated under new programs funded under the direction of the author of the present disclosure.

How the Present System-level Disclosure of a Telecom-type and Structured, Pixel-signal Processing System Enables and Benefits from Hybrid/Composite Pixel-logic encoding Technologies and Devices One of the key differentiating characteristics of the present system is de-compose pixel-signal processing stages into optimized device/materials system operations, with a recognition of wavelength/materials system dependence for different "X"O effects ("X" can be magnetic, electric, thermal, mechanical, acoustic, etc.) and a deliberate design bias towards designing devices and systems where devices can operate on "frequencies of convenience," at least to a greater degree than otherwise if not absolutely in every case, given "holistic" design optimization of the system overall.

If combining different devices in a composite or merged device functionality is contemplated, there is a tendency for the problem of wavelength-dependence of the effects in question to be exacerbated. Because now one is trying to arrive at the intersection of conditions for multiple materials systems and effects that at least are "congenial" if not optimal for all of them. The intersection of requirements may be expected to be found within a narrower range than the requirements for any one of them alone. (For fabrication-related consequences of this "intersection" problem, reference is made to co-pending application 3D fab, materials system, and devices therefrom, see, for example, incorporated multi-tiered structures applications, which describes a eutectic materials system to enable co-processing of materials that can provide super functionality in every parameter of a device or structural system).

The advantages that may be gained by combining effects have in fact been demonstrated in key cases in programs that have provided part of the background of this disclosure, as referenced earlier herein.

Categories of Hybridization

There are three categories of hybrid pixel technologies: that is combinations of technologies, each of which contributes to improved performance and functionality, but which together are able to reach and surpass functionality thresholds that none could necessarily reach if employed on their own.

Another way to characterize this "hybridization" that conveys a substantial meaning and not just a vague "catch-phrase" significance is this: they are novel "mutations" or evolutions of technologies tied together in composite/complex systems that are not solely two technologies co-located and providing signal components to a consolidated pixel channel (in large part the subject of pending "Telecom Structured System"), but rather a different process or device or materials structure that functions differently and performs better.

Three broad categories of improved devices are: hybrids of different MO-type effects and non-MO effects/devices; hybrids of different MO-type effects/devices and other MO-type devices/effects; and perhaps most importantly, hybrids of different MO-type devices/effects and non-reciprocal effects and processes generally and "slow light" effects and techniques:

1. Hybrid MO/non-MO devices:
   a. MO (Faraday, MOKE, Cotton-Mouton, and hybrids of these (see #2)+Mach-Zehnder and Michelson—and other interferometric-based devices)
   b. MO (Faraday, MOKE, hybrids of these+PPLN-based rotation"**.
2. Hybrid MO/MO devices:
   a. Faraday, MOKE, Cotton-Mouton
   b. 2D and 3D PC's from combination of hatched grating and multilayer films
   c. add reflective MO elements
3. Hybrid MO/non-reciprocal effects+slow-light techniques Rather than provide a repeated breakdown of an example for each type, the subject matter of which is addressed as well in previously referenced co-pending applications, instead one preferred design will be described, with some options provided in relation to that design.

First, explanation of the third category is in order, because this is the most advanced version of hybrid types with potentially the greatest application, alone and in additional hybridized-combination with other MO- and non-MO effects and compatible device types and operations.

Hybrid MO/non-reciprocal effects+slow-light techniques:

Realizing new categories of switches that are not simply additive effect or modulation of a signal by constituent devices in series.

From the late 2000's, new work was funded by the author of the present disclosure for the purpose of proving and realizing the potential of combining non-reciprocal MO techniques with so-called "slow-light techniques" to achieve improved fundamental MO-related switches for a broad range of applications.

This idea of harnessing the fertile crossover between these two lines of development, with the insight that these effects were related and techniques related to one could be used to realize combined, novel effects and enhancement of the original MO-related focus, was first proposed by the author of the present application at a private research symposium for several research groups working under his direction, in 2007. Research findings in slow-light were reported and the common ground for hybrid development explored.

From this initial direction, at least two successful development efforts were undertaken.

One of these was reported by one of the groups present, led by V. I. Belotelov: Belotelov V. I. Slow light phenomenon and extraordinary magnetooptical effects in periodic nanostructured media. J Magn Magn Mater 321:3 (2009)

The second line of development from this common origin culminated in this most recently reported work from a group led by Miguel Levy (with Chakravarty listed as first author in this particular paper):

PHYSICAL REVIEW B 84, 094202 (2011), Elliptical normal modes and stop band, reconfiguration in multimode birefringent one-dimensional magnetophotonic crystals, Ashim Chakravarty, Miguel Levy, Amir A. Jalali, and Zhuoyuan Wu, Department of Physics, Michigan Technological University, 1400 Townsend Drive, Houghton, Mich. 49931 USA Alexander M. Merzlikin, Institute of Theoretical and Applied Electromagnetics, Russian Academy of Sciences Moscow 125412, Russia, (Received 24 May 2011; published 12 Sep. 2011)—ABSTRACT: This study examines photonic stop band reconfiguration upon magnetization reversal in multimode elliptically birefringent Bragg filter waveguides. Magnetization reversal in longitudinally magnetized magneto-optic waveguides affects the character of the local orthogonal elliptically polarized normal modes, impacting the filter's stop band configuration. Unlike the standard case of circular birefringence in magneto-optic media, opposite helicity states do not transform into each other upon magnetization reversal for a given propagation direction. Rather, helicity reversals yield new and different normal modes with perpendicularly oriented semi-major axes, corresponding to a north-south mirror reflection through the equatorial plane of the Poincar e sphere. For asymmetric contra-directional coupling between different-order-waveguide modes in multimode magneto-photonic crystals, this symmetry breaking, namely, the obliteration of normal modes upon magnetization reversal, allows for strongly reconfigured stop bands, through the hybridization of the elliptically polarized states. The effect of Bloch mode reconfiguration on the stop band spectral profile contributes to the magnetic response of the filter. In such elliptically birefringent media, input polarization helicity reversal also becomes a powerful tool for optical transmittance control. Both magnetization and helicity reversals can thus serve as useful tools for the fabrication of on-chip magneto-photonic crystal switches.

Optimization of the second line of development proposed by Miguel Levy et al, under funding of an overall parent program under the direction of the author of the present disclosure, has been undertaken under a team the direct leadership of researcher Miguel Levy.

The purpose of this program has been to implement and commercialize the basic constituent hybrid device (specifically invented by Levy et al), which realizes a new fundamental new optical switch, a hybrid MO-related switch, of extremely high-speed, small feature size, high-contrast and low power, and very importantly, the elimination of the need for crossed polarizers to implement a complete physical light-valve or switch—to work in combination with other improved MO-related device features, such as those outlined earlier for the more "basic" type of MO-related device, into a high-performance integrated OPTO-VLSI array architecture, for display and non-display data applications.

Other improved features required to fully implement and benefit from the Levy hybrid MO-related switch for the hybrid device and signal-processing system of the present disclosure:

1. MINIMIZE FILL-FACTOR AND INCREASED B-FIELD EFFICIENCY: "Feeder" planar waveguide in MO material (film) subject to imposed B fields: use of "light baffle" switchback routing of waveguide to minimize feature-size, fill-factor, and increased device efficiency (see previous pending application by the author of the present application Panorama LIGHT BAFFLE Application: in which calculated point-defect implemented by ion implantation to effect nearly 90 degree bends)

The improved proposal of the present disclosure implements point-defect in non-buried rib-waveguide, avoiding ion-implantation requirement, and/or employs opposed confinement "hatched" gratings (2D periodic structures) at bends fabricated in raised 2. FIELD-GENERATING STRUCTURES: Top/Bottom structures for uniform saturation. Top field-generating structure follows an opposing "switchback" or "spiral" type nested planar coliform, following the same "transparent to signal frequency" methods described under the more "basic" subtype above.

Bottom field generating structure, not required to be transparent to the signal frequency, is advantageously fabricated from a extremely conductive and efficient field-generating material, such as patterned graphene, following the proposal described under the more "basic" device type above.

3. Addressing: from "bottom" layer, fabricated on silicon or quartz glass substrate (both preferable to specialized iron-garnet type substrates such as GGG).

The MO materials are deposited on the substrate and then, in this preferable structure and fabrication option, the MO materials (masked) are deposited following the proposals within previously referenced co-pending applications, 3D device fab, materials system, and devices therefrom and 3D PIC/SLM, as well as following fabrication options known to the art and referenced in earlier disclosures by the author of the present disclosure.

Further proposed modifications to improve the functioning of the Levy fundamental switch:

4. 3D periodic structures, combining multilayer periodic film composites (including exchange coupled options) with etched "hatched" gratings:

This improvement to the Levy fundamental switch (different from #1-#3), the improved "missing parts" for the Levy switch to complete it as a complete light-valve/switch device, is a hybrid combination of the Levy 1D or 2D grating with the multilayer MPC methods typified by Belotelov, Kotov, Inoue et al., as well as optional implementation of non-Faraday effect-derived polarization rotation (reflective, i.e., MOKE or Cotton-Mouton, or PPLN rotator).

Structure: In previous proposals by the author of the present proposal, planar rotators enabled for display and SLM applications by means of in-coupling and out-coupling mirror or point-defect sets. In co-pending application 3D PIC and SLM, a complete system for such in-plane/out-of-plane signal processing is proposed.

Levy et al, as part of the previously cited programs, successfully fabricated and demonstrated the planar devices in conjunction with the early version of the coupling optics.

In this present proposal for improvement of the new Levy fundamental switch, consisting of the hybridization of these here-to-for distinct and incompatible MPC methods and structures—planar gratings and multilayer dielectric film stacks/MPC's—a variation of in-coupling optics is proposed to direct a signal beam into 3D periodic structure into a "planar virtual cavity", wherein the beam mimics the PC penetration and reflection interactions more typical of Bragg-grating type PC's of PC optical fibers.

Components and signal propagation steps in the "feeder stage" of the Levy switch:

a. A signal is coupled into the plane from out of the plane, either originating from behind the backplane (i.e., substrate) or originating as a signal from the "top" side of the device (NB, planar to planar is also provided for).

If via the substrate, through a "quasi-transmissive" channel through the backplane of the substrate into the "virtual cavity" via a reflective mirror, point defect, or periodic structure (see co-pending 3D PIC etc. for details) that implements a 45 degree mirror and in effect a 90 degree "bend" in the path, so that the signal transitions from normal to the plane of the device to propagating parallel to the plane of the device.

If originating from the more conventional "facing" direction of SLM's and reflective displays, the coupling is via an angle greater than 45 degrees to normal. The signal will then be bounced "down" towards the plane.

b. But differently from other versions from the present author, a portion of the remaining MO film that forms the surface remaining after the lithographic-etch process that fabricates the gratings structures and "hatched" gratings structures is etched into that surface, creating a pit or short trench. So that the signal bounced down "at" the surface (instead of parallel to the surface" is inserted into the pit or trench.

c. The signal so deflected then meets the "wall" that is formed by the deeper etch into the surface; preferably this "wall" is not 90 degrees, but rather forms an angle less than 90 degrees to normal, so that light is more efficiently coupled into the "virtual cavity" into which the signal is being inserted.

d. This cavity is composed of the following structures, with options:

A multilayer film of MO and dielectric films, including optionally relatively harder and softer magnetizations (if that is the case, then the "hard" MO material is optimized for either latching or domain management characteristics—its magnetic function is more important—and the "soft" MO material is optimized for MO effect, and they work cooperatively in ways more difficult for single-formulation materials), or more typical MPC multilayer compositions in which active layers are typically lambda/4 in thickness.

A bottom layer of this composition is a patterned dielectric mirror, following high, omnidirectional reflectivity of commercial PC products from Omniguide (Yoel Fink, John Joannopoulos et al; MIT).

e. The original and current version of the Levy switch employs either a grating (1D periodic structure) or a pattern of micro-pillars (2D periodic structures have been modeled) in an LPE MO film.

So, instead of a single LPE film, there is a multi-layer stack (which may include an LPE thick film as substantially studied by Levy et al); this stack is then etched and cross-etched (hatched), leaving a periodic array of pillars which are themselves multilayer structures—thus, practical 3D periodic structures, offering all the efficiencies and higher-order effects of modeled (but less often fabricated) 3D photonic crystals.

f. This fabrication model will enable new PIC designs impossible with either the constraints of the multilayer film approach, which tends to require stacks of so many layers as to become costly and impractical, in terms of defect rates, etc. And also impossible to either the fabricated 1D gratings or the modeled 2D pillars.

g. To effectively confine the signal to the virtual cavity between the bottom dielectric mirror and the surface of the composite 3D PIC structure, a capping reflective material or dielectric mirror or sufficiently index-contrasting material (such as an appropriate aerogel material), which can also preserve close to the index contrast of air for the air-gapped gratings, as well as protect fragile surface features from accidental crushing—see co-pending application 3D pic and SLM.

This is also serving as a protective buffer layer deposited on top of the feeder section (and other operative structures of the Levy-type switch that implements the switchable stop-band configuration). Field generating switchback structures may be deposited top of the reflective cap or directly on the periodic materials—this will depend on the materials and how they may interfere or not with the 3D PC structure's function.

The composite "virtual cavity" thus will consist of reflective top and bottom sealed and/or filled and sealed 3D periodic structure.

h. The signal's entry will be calculated so that the signal will propagate and penetrate (at least partly) through the multilayer pillars, not normal to either the grating or to the plane of the multilayer, but rather as the signal bounces at a typical forward 45 degrees down the modified feeder channel, through multiple reflections down the virtual cavity in a manner very similar to the propagation of a signal down a photonic crystal fiber's Bragg-grating-type structure—until the signal finally reaches the exit end mirror surface of 45 degrees or other angle sufficient to couple the signal back into the next stage of the Levy switch, which relative to the entire multilayer structure, is fabricated substantially in the top thick film layer.

i. Optional hybrids of MOKE and PPLN rotators: given the requirement for reflective surfaces that confines the signal to the virtual cavity, as well as reflective surfaces to couple the signal into the cavity and out, there are opportunities to employ MOKE and (and even potentially PPLN) materials and devices in the reflective structures. Cotton-Mouton is an auxiliary option for further polarization mode manipulation, if needed.

MOKE, implemented in the bottom reflective layer structure that confines the signal from the buried internal layer, is the most likely hybridization opportunity to add to and improve on the major innovation of Levy's switch. Addressing and energizing of MOKE is implemented via the same addressing and interconnect, as it is not a separate state operator from the primary Faraday-type effect.

Improvements in Kerr-rotation materials generally makes this objective of seriously significant value, and it will be evident from the general pattern that other hybrid versions are contemplated beyond the specific embodiment provided by way of illustrating the essential case.

For further improvements to this fundamental building-block of the "Levy+" signal logic device system disclosed herein, this device-level system specification allows for addition to the device footprint of a Mach-Zehnder or Michelson interferometer-based device, as well as potential hybrids with the slow-light/MO fusions of Belotelov et al.

Note is made now of co-pending application, Wireless addressing and powering of arrays, as there is a mutual value ratchet between employment of the Levy encoder combined with the improved device components proposed herein that fully realize the potential of the Levy switch, as well as the proposed improvements to the MO Feeder section of the device, with an addressing and powering system that eliminates the problem of continuous lines of interconnect and devices in series, especially relevant to large areas, both in terms of number of array elements and in terms of size (area/volume).

Note is made again of incorporated multi-tiering application which proposes a generalized system for in-coupling and out-coupling signals, data or pixel signal, for a 3D PIC/SLM (display and non-display), and for handling signal between layers of such a system as well.

Note is also made of co-pending 3D fab, materials, and devices therefrom for fiber-type and 3D fiber-structured versions of the present disclosure that implements an analogous version of the wafer-type physical fab system detailed herein.

ALL DISPLAY TYPES MAY BE FABRICATED USING ONE OR MORE OF THE PROPOSALS FROM: TELECOM-STRUCTURED, WIRELESS ADDRESS AND POWER, 3D PIC/SLM, 3D FAB AND MATERIALS SYSTEM AND DEVICES THEREBY.

ADDITIONAL REFERENCES

1. Observation of the Inverse Cotton-Mouton Effect, A. Ben-Amar Baranga1,#, R. Battesti1, M. Fouché1,2,3, C. Rizzo1,2,3,* and G. L. J. A. Rikken1, 1 Laboratoire National des Champs Magń etiques Intenses, (UPR 3228, CNRS-INSA-UJF-UPS), F-31400 Toulouse Cedex, France, 2 Universít e de Toulouse, UPS, Laboratoire Collisions Agŕ egats Ŕ eactivít e, IRSAMC, F-31062 Toulouse, France, 3 CNRS, UMR 5589, F-31062 Toulouse, France, # Permanent address: NRCN, P.O. Box 9001, Beer-Sheva 84190, Israel, * Corresponding author: carlo.rizzo@lncmi.cnrs.fr
2. Microscopic theory of the inverse Faraday effect, Riccardo Hertel, Institute of Solid State Research (IFF), Research Center Jelich, D-52425 Jülich, Germany, An analytic expression is given for the inverse Faraday effect, i.e. for the magnetization occurring in a transparent medium exposed to a circularly polarized high-frequency electromagnetic wave. Using a microscopic approach the magnetization of the medium due to the inverse Faraday effect is identified as the result of microscopic solenoidal currents generated by the electromagnetic wave. In contrast to the better known phenomenological derivation, the microscopic treatment provides important information on the frequency dependence of the inverse Faraday effect.
3. Inverse Transverse Magneto-Optical Kerr Effect, V. I. Belotelov1,2, A. K. Zvezdin1, 1 A. M. Prokhorov General Physics Institute RAS, 38 Vavilov st., Moscow, 119991 Russia, 2M. V. Lomonosov Moscow State Univ., Moscow, 119991, Russia~Abstract It is demonstrated that a static in-plane magnetic field is generated in a ferromagnetic film by p-polarized light obliquely incident on the film. This phenomenon can be called inverse transverse magneto-optical Kerr effect. The femtosecond laser pulse of peak intensity of 500 W/$\mu$m2 generates in nickel an effective magnetic field of about 100 Oe. The value of the effective magnetic field can be increased by more than an order of magnitude at the surface plasmon polariton resonance excited in smooth metal dielectric structures or in plasmonic crystals.
4. Geometrical confinement effects on the magnetization and polarization response in resonant magneto-optic rotator waveguides Xiaoyue Huang n, Ziyou Zhou, Raghav Vanga Physics Department, Michigan Technological University, Houghton, Mich. 49931, USA, (latching by means of opposed grating structures, work done under M. Levy), Journal of Magnetism and Magnetic Materials
5. **Polarization rotation in in PPLN: Chirality control by electric field in periodically poled MgO-doped lithium niobate, Lei Shi, Linghao Tian, Xianfeng Chen*, Department of Physics, The State Key Laboratory on Fiber Optic Local Area Communication Networks and Advanced Optical Communication Systems, Shanghai Jiao Tong University, 800 Dongchuan Rd., Shanghai, 200240, People's Republic of China *xfchen@sjtu.edu.cn: We study the chirality of periodically poled MgO-doped lithium niobate (MgO:PPLN) by in MgO:PPLN when quasi-phase-matching (QPM) condition is satisfied, which is similar to natural optical active material like quartz. The specific rotation of MgO:PPLN by EO effect is shown to be proportional to the transverse electric field, making large polarization rotation in optical active material with small size possible. We also demonstrate that the chirality of MgO:PPLN can be controlled by external electric field.

While particular embodiments have been disclosed herein, they should not be construed to limit the application and scope of the proposed novel image display and projection, based on de-composing and separately optimizing the operations and stages required for pixel modulation.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired by Letters Patent of the United States is:

1. A magneto photonic encoder, comprising:
   a multilayer photonic crystal (MPC) including an input portion, an encoding portion, an output portion, an input interface between said input portion and said encoding portion, and an output interface between said encoding region and said output portion wherein said encoding portion includes a set of periodic MPC structures having an overlying reflective layer;
   a substrate supporting said multilayer photonic crystal;
   a first path-optic, disposed on said input portion, configured to direct an input beam of photons into said input interface at an angle for total internal reflection producing a propagating beam of photons through said set of periodic MPC structures with said propagating beam of photons having a polarization attribute;
      a first mechanism, physically associated with said encoding portion, configured to produce a first controllable magnetic field within said set of periodic MPC structures to controllably rotate said polarization attribute producing a polarization-modified propagating beam of photons at said output interface; and
   a controller coupled to said first mechanism to control a particular one magnetic field for said controllable magnetic field producing said polarization-modified propagating beam of photons with a particular polarization.

2. The magneto-photonic encoder of claim 1 further comprising:
   a second mechanism, disposed within said substrate and physically associated with said encoding portion and coupled to said controller, configured to produce a second controllable magnetic field within said set of periodic MPC structures to controllably rotate said polarization attribute producing said polarization-modified propagating beam of photons.

3. The magneto-photonic encoder of claim 1 further comprising:
   a second path-optic, disposed on said output portion, configured to receive said polarization-modified propagating beam of photons from said output interface and direct said polarization-modified propagating beam of photons into a non-reciprocal-mode conversion device producing an encoded beam of photons.

4. The magneto-photonic encoder of claim 2 further comprising:
   a second path-optic, disposed on said output portion, configured to receive said polarization-modified propagating beam of photons from said output interface and direct said polarization-modified propagating beam of photons into a non-reciprocal-mode conversion device producing an encoded beam of photons.

5. The magneto-photonic encoder of claim 3 further comprising:
   a third path-optic, disposed on said output portion, configured to receive said encoded beam of photons and produce an output beam of photons.

6. The magneto-photonic encoder of claim 4 further comprising: a third path-optic, disposed on said output portion, configured to receive said encoded beam of photons and produce an output beam of photons.

7. The magneto-photonic encoder of claim 5 wherein said input beam of photons propagates in a first direction generally perpendicular to a plane parallel to said substrate, wherein said propagating beam of photons propagates in a second direction generally parallel to said plane, and wherein said output beam of photons propagates in a third direction generally perpendicular to said plane and generally parallel to said first direction.

8. The magneto-photonic encoder of claim 6 wherein said input beam of photons propagates in a first direction generally perpendicular to a plane parallel to said substrate, wherein said propagating beam of photons propagates in a second direction generally parallel to said plane, and wherein said output beam of photons propagates in a third direction generally perpendicular to said plane and generally parallel to said first direction.

9. The magneto-photonic encoder of claim 1 wherein encoding portion includes a two dimensional region, wherein said set of periodic MPC structures includes a plurality of subsets of said periodic MPC structures, each said subset of periodic MPC structures disposed within said two-dimensional region and supporting a portion of a propagating path for said propagating beam of photons, wherein at least one said portion of said propagating path of a first said subset of said periodic MPC structure is non-aligned with at least another one said portion of said propagating path of a second said subset of said periodic MPC structure further comprising a set of path optics routing said portions of said propagating path through all said subsets of periodic MPC structures.

10. The magneto-photonic encoder of claim 2 wherein said encoding portion includes a two dimensional region, wherein said set of periodic MPC structures includes a plurality of subsets of said periodic MPC structures, each said subset of periodic MPC structures disposed within said two-dimensional region and supporting a portion of a propagating path for said propagating beam of photons, wherein at least one said portion of said propagating path of a first said subset of said periodic MPC structure is non-aligned with at least another one said portion of said propagating path of a second said subset of said periodic MPC structure further comprising a set of path optics routing said portions of said propagating path through all said subsets of periodic MPC structures.

11. The magneto-photonic encoder of claim 3 wherein said encoding portion includes a two dimensional region, wherein said set of periodic MPC structures includes a plurality of subsets of said periodic MPC structures, each said subset of periodic MPC structures disposed within said two-dimensional region and supporting a portion of a propagating path for said propagating beam of photons, wherein at least one said portion of said propagating path of a first said subset of said periodic MPC structure is non-aligned with at least another one said portion of said propagating path of a second said subset of said periodic MPC structure further comprising a set of path optics routing said portions of said propagating path through all said subsets of periodic MPC structures.

12. The magneto-photonic encoder of claim 4 wherein said encoding portion includes a two dimensional region, wherein said set of periodic MPC structures includes a plurality of subsets of said periodic MPC structures, each said subset of periodic MPC structures disposed within said two-dimensional region and supporting a portion of a propagating path for said propagating beam of photons, wherein at least one said portion of said propagating path of a first said subset of said periodic MPC structure is non-aligned with at least another one said portion of said propagating path of a second said subset of said periodic MPC structure further comprising a set of path optics routing said portions of said propagating path through all said subsets of periodic MPC structures.

13. The magneto-photonic encoder of claim 5 wherein said encoding portion includes a two dimensional region, wherein said set of periodic MPC structures includes a plurality of subsets of said periodic MPC structures, each said subset of periodic MPC structures disposed within said two-dimensional region and supporting a portion of a propagating path for said propagating beam of photons, wherein at least one said portion of said propagating path of a first said subset of said periodic MPC structure is non-aligned with at least another one said portion of said propagating path of a second said subset of said periodic MPC structure further comprising a set of path optics routing said portions of said propagating path through all said subsets of periodic MPC structures.

14. The magneto-photonic encoder of claim 6 wherein said encoding portion includes a two dimensional region, wherein said set of periodic MPC structures includes a plurality of subsets of said periodic MPC structures, each said subset of periodic MPC structures disposed within said two-dimensional region and supporting a portion of a propagating path for said propagating beam of photons, wherein at least one said portion of said propagating path of a first said subset of said periodic MPC structure is non-aligned with at least another one said portion of said propagating path of a second said subset of said periodic MPC structure further comprising a set of path optics routing said portions of said propagating path through all said subsets of periodic MPC structures.

15. The magneto-photonic encoder of claim 7 wherein said encoding portion includes a two dimensional region, wherein said set of periodic MPC structures includes a plurality of subsets of said periodic MPC structures, each said subset of periodic MPC structures disposed within said two-dimensional region and supporting a portion of a propagating path for said propagating beam of photons, wherein at least one said portion of said propagating path of a first said subset of said periodic MPC structure is non-aligned with at least another one said portion of said propagating path of a second said subset of said periodic MPC structure further comprising a set of path optics routing said portions of said propagating path through all said subsets of periodic MPC structures.

16. The magneto-photonic encoder of claim 8 wherein said encoding portion includes a two dimensional region, wherein said set of periodic MPC structures includes a plurality of subsets of said periodic MPC structures, each said subset of periodic MPC structures disposed within said two-dimensional region and supporting a portion of a propagating path for said propagating beam of photons, wherein at least one said portion of said propagating path of a first said subset of said periodic MPC structure is non-aligned with at least another one said portion of said propagating path of a second said subset of said periodic MPC structure further comprising a set of path optics routing said portions of said propagating path through all said subsets of periodic MPC structures.

17. The magneto-photonic encoder of claim 9 wherein said two dimensional region includes a rectilinear area, wherein each said subset of said periodic MPC structures are parallel to each other and disposed within said rectilinear area, and wherein said portions of said propagating path are parallel to each other.

18. The magneto-photonic encoder of claim 10 wherein said two dimensional region includes a rectilinear area, wherein each said subset of said periodic MPC structures are parallel to each other and disposed within said rectilinear area, and wherein said portions of said propagating path are parallel to each other.

19. The magneto-photonic encoder of claim 11 wherein said two dimensional region includes a rectilinear area, wherein each said subset of said periodic MPC structures are parallel to each other and disposed within said rectilinear area, and wherein said portions of said propagating path are parallel to each other.

20. The magneto-photonic encoder of claim 12 wherein said two dimensional region includes a rectilinear area, wherein each said subset of said periodic MPC structures are parallel to each other and disposed within said rectilinear area, and wherein said portions of said propagating path are parallel to each other.

21. The magneto-photonic encoder of claim 13 wherein said two dimensional region includes a rectilinear area, wherein each said subset of said periodic MPC structures are parallel to each other and disposed within said rectilinear area, and wherein said portions of said propagating path are parallel to each other.

22. The magneto-photonic encoder of claim 14 wherein said two dimensional region includes a rectilinear area, wherein each said subset of said periodic MPC structures are parallel to each other and disposed within said rectilinear area, and wherein said portions of said propagating path are parallel to each other.

23. The magneto-photonic encoder of claim 15 wherein said two dimensional region includes a rectilinear area, wherein each said subset of said periodic MPC structures are parallel to each other and disposed within said rectilinear area, and wherein said portions of said propagating path are parallel to each other.

24. The magneto-photonic encoder of claim 16 wherein said two dimensional region includes a rectilinear area, wherein each said subset of said periodic MPC structures are parallel to each other and disposed within said rectilinear area, and wherein said portions of said propagating path are parallel to each other.

25. A method for encoding a photonic beam, comprising:
receiving the photonic beam into a magneto photonic encoder, including a multilayer photonic crystal (MPC) including an input portion, an encoding portion, an output portion, an input interface between said input portion and said encoding portion, and an output interface between said encoding region and said output portion wherein said encoding portion includes a set of periodic MPC structures having an overlying reflective layer; a substrate supporting said multilayer photonic crystal; a first path-optic, disposed on said input portion, configured to direct an input beam of photons into said input interface at an angle for total internal reflection producing a propagating beam of photons through said set of periodic MPC structures with said propagating beam of photons having a polarization attribute; a first mechanism, physically associated with said encoding portion, configured to produce a first controllable magnetic field within said set of periodic MPC structures to controllably rotate said polarization attribute producing a polarization-modified propagating beam of photons at said output interface; and a controller coupled to said first mechanism to control a particular one magnetic field for said controllable magnetic field producing said polarization-modified propagating beam of photons with a particular polarization;
setting a polarization rotation for the propagating beam of light in said encoding portion producing said polarization-modified propagating beam of photons;
interacting said polarization-modified propagating beam of photons with a non-reciprocal-mode conversion device to set a transmissive amplitude for the photonic beam exiting from said non-reciprocal-mode conversion device; and
encoding the photonic beam exiting from said non-reciprocal-mode conversion device.

* * * * *